(12) United States Patent
Van Leeuwen et al.

(10) Patent No.: US 11,030,124 B2
(45) Date of Patent: Jun. 8, 2021

(54) SEMICONDUCTOR DEVICE WITH SECURE ACCESS KEY AND ASSOCIATED METHODS AND SYSTEMS

(71) Applicant: Micron Technology, Inc., Boise, ID (US)

(72) Inventors: Brenton P. Van Leeuwen, Meridian, ID (US); Nathaniel J. Meier, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 16 days.

(21) Appl. No.: 16/677,376

(22) Filed: Nov. 7, 2019

(65) Prior Publication Data

US 2021/0141744 A1 May 13, 2021

(51) Int. Cl.
*G06F 12/14* (2006.01)
*G06F 12/00* (2006.01)
(Continued)

(52) U.S. Cl.
CPC ...... *G06F 12/1491* (2013.01); *G06F 12/1466* (2013.01); *G11C 17/16* (2013.01);
(Continued)

(58) Field of Classification Search
CPC .. G06F 12/1491; G06F 12/1466; G06F 17/16; G06F 12/1408; G06F 2212/1052; G06F 21/78; H04L 9/08; H04L 2463/062
(Continued)

(56) References Cited

U.S. PATENT DOCUMENTS 7,865,659 B2 * 1/2011 Ramesh .............. G06F 12/1433
711/103
8,286,883 B2 * 10/2012 Asnaashari ........... G06F 3/0655
235/492
(Continued)

FOREIGN PATENT DOCUMENTS

KR 20100031148 A 3/2010

OTHER PUBLICATIONS

International Application No. PCT/US2020/054860—International Search Report and Written Opinion, dated Jan. 27, 2021, 11 pages.
(Continued)

*Primary Examiner* — Ly D Pham
(74) *Attorney, Agent, or Firm* — Perkins Coie LLP

(57) ABSTRACT

Memory devices, systems including memory devices, and methods of operating memory devices are described, in which security measures may be implemented to control access to a fuse array (or other secure features) of the memory devices based on a secure access key. In some cases, a customer may define and store a user-defined access key in the fuse array. In other cases, a manufacturer of the memory device may define a manufacturer-defined access key (e.g., an access key based on fuse identification (FID), a secret access key), where a host device coupled with the memory device may obtain the manufacturer-defined access key according to certain protocols. The memory device may compare an access key included in a command directed to the memory device with either the user-defined access key or the manufacturer-defined access key to determine whether to permit or prohibit execution of the command based on the comparison.

20 Claims, 11 Drawing Sheets

(51) Int. Cl.
  *G11C 17/16* (2006.01)
  *G06F 21/78* (2013.01)
  *H04L 9/08* (2006.01)
(52) U.S. Cl.
  CPC .......... *G06F 12/1408* (2013.01); *G06F 21/78* (2013.01); *G06F 2212/1052* (2013.01); *H04L 9/08* (2013.01); *H04L 2463/062* (2013.01)
(58) Field of Classification Search
  USPC .......... 711/164, E12.094, E12.001, E12.092; 713/193
  See application file for complete search history.

(56) References Cited

U.S. PATENT DOCUMENTS

| | | | |
|---|---|---|---|
| 9,419,951 | B1 | 8/2016 | Felsher et al. |
| 10,803,969 | B1* | 10/2020 | Bell ...................... G11C 11/409 |
| 2004/0170068 | A1 | 9/2004 | Williams |
| 2005/0289355 | A1 | 12/2005 | Kitariev et al. |
| 2006/0085702 | A1 | 4/2006 | Qureshi et al. |
| 2008/0143373 | A1 | 6/2008 | Bonaccio et al. |
| 2009/0007275 | A1 | 1/2009 | Gehrmann et al. |
| 2009/0089529 | A1 | 4/2009 | Miranda et al. |
| 2014/0189365 | A1 | 7/2014 | Cox et al. |
| 2016/0099810 | A1 | 4/2016 | Li et al. |
| 2016/0321472 | A1 | 11/2016 | Pedersen |
| 2017/0098082 | A1 | 4/2017 | Henry |
| 2018/0096979 | A1 | 4/2018 | Pappu et al. |
| 2018/0152444 | A1* | 5/2018 | Caterino ............. H04L 63/0853 |
| 2018/0167199 | A1 | 6/2018 | Kaul et al. |
| 2018/0189493 | A1 | 7/2018 | Schilder et al. |
| 2018/0307867 | A1 | 10/2018 | Dover |
| 2019/0349426 | A1* | 11/2019 | Smith .................... H04W 84/22 |
| 2020/0334171 | A1* | 10/2020 | Meier ................. G06F 12/1466 |

OTHER PUBLICATIONS

International Application No. PCT/US2020/054866—International Search Report and Written Opinion, dated Jan. 26, 2021, 11 pages.
International Application No. PCT/US2020/055128—International Search Report and Written Opinion, dated Jan. 26, 2021, 9 pages.
International Application No. PCT/US2020/055118—International Search Report and Written Opinion, dated Mar. 5, 2021, 8 pages.

* cited by examiner

SEMICONDUCTOR DEVICE WITH SECURE ACCESS KEY AND ASSOCIATED METHODS AND SYSTEMS

TECHNICAL FIELD

The present disclosure generally relates to semiconductor devices, and more particularly relates to a semiconductor device with a secure access key and associated methods and systems.

BACKGROUND

Memory devices are widely used to store information related to various electronic devices such as computers, wireless communication devices, cameras, digital displays, and the like. Memory devices are frequently provided as internal, semiconductor, integrated circuits and/or external removable devices in computers or other electronic devices. There are many different types of memory, including volatile and nonvolatile memory. Volatile memory, including random-access memory (RAM), static random-access memory (SRAM), dynamic random-access memory (DRAM), and synchronous dynamic random-access memory (SDRAM), among others, require a source of applied power to maintain its data. Nonvolatile memory, by contrast, can retain its stored data even when not externally powered. Nonvolatile memory is available in a wide variety of technologies, including flash memory (e.g., NAND and NOR), phase change memory (PCM), ferroelectric random-access memory (FeRAM), resistive random-access memory (RRAM), and magnetic random-access memory (MRAM), among others. Improving memory devices, generally, may include increasing memory cell density, increasing read/write speeds or otherwise reducing operational latency, increasing reliability, increasing data retention, reducing power consumption, or reducing manufacturing costs, among other metrics.

DETAILED DESCRIPTION

Figure 1:
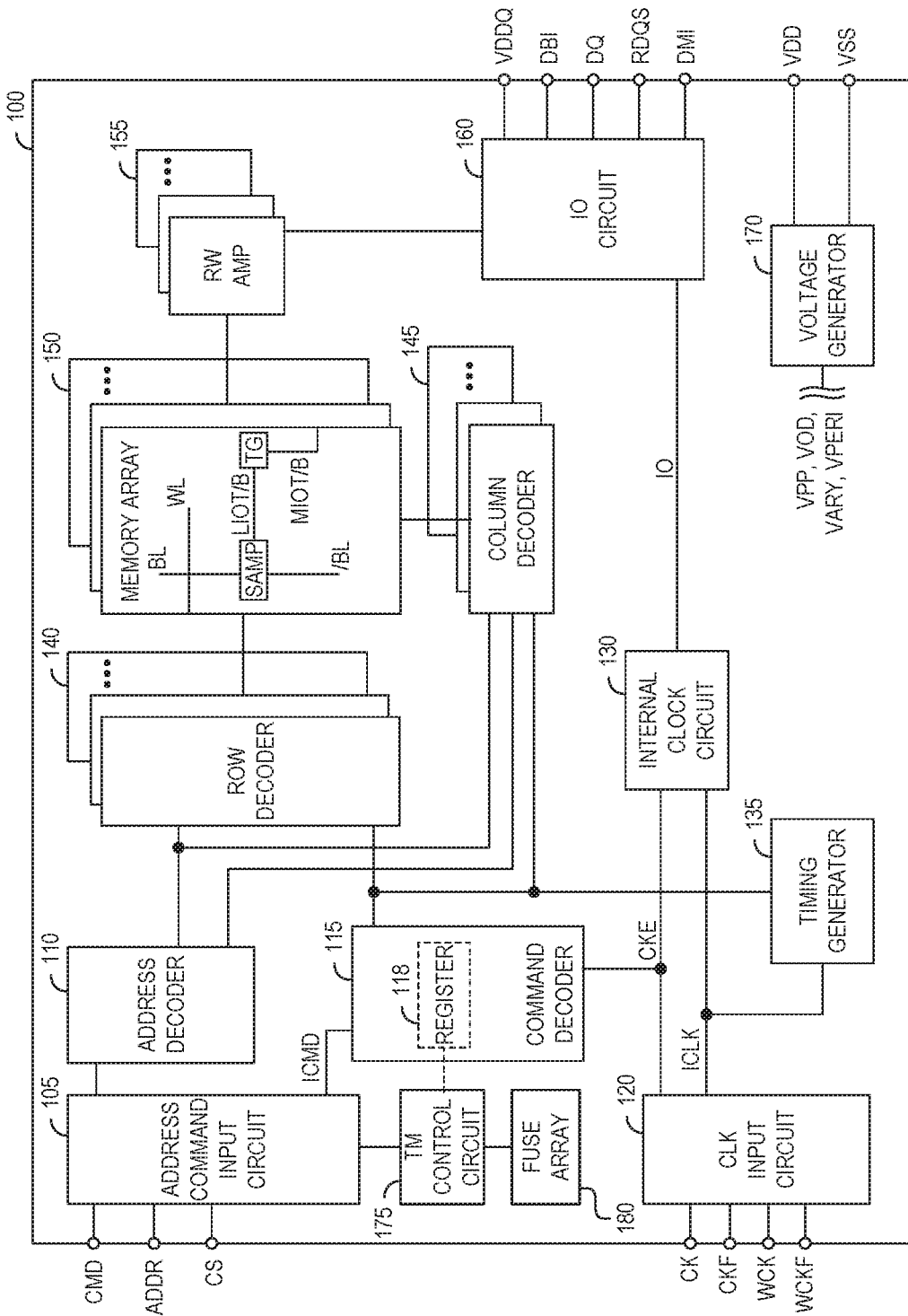
FIG. 1 is a block diagram schematically illustrating a memory device in accordance with an embodiment of the present technology.

A memory device may support various operational features. Some of the operational features may be described in a specification of the memory device such that an end-user of the memory device may utilize the operational features described in the specification. In addition, the memory device may be configured to support special operational features that require controlled access, which may be referred to as secure features. Such secure features may include design-for-test (DFT) functions (which may also be referred to as design-for-manufacturing (DFM) functions). In some embodiments, the DFT functions include vendor-specific features or functions (e.g., test modes that are accessible only by the manufacture of the memory device), special features or functions (e.g., certain test modes, special capabilities) that may be activated for a selected customer or a selected set of memory devices, an access to a fuse array (or other nonvolatile memory elements of the memory device), or the like. Various test modes, features, and/or functions under the DFT functions may be referred to as DFT modes, in some cases. The DFT functions provide flexibility to modify operational characteristics of the memory device without implementing permanent changes to the memory device design. For example, the DFT functions may enable the memory device to perform certain operations temporarily under the test mode to evaluate feasibility of the operations. In some cases, the DFT functions may program the fuse array such that a special capability can be enabled as a default for certain customers. In other examples, the DFT (or DFM) functions may selectively configure the memory device to operate pursuant to customer requirements—e.g., a customer requiring×4 memory devices while another customer requiring×8 memory devices.

The DFT functions may be abused by an unauthorized or hostile actor to permanently damage the memory device or degrade the memory device in undesirable ways. For example, the memory device may store various operational information in the nonvolatile memory elements, which the memory device needs to retain without power. The operational information stored in the nonvolatile memory elements may include critical information associated with the secure features (e.g., DFT functions, entries to the test modes and/or special capabilities) and/or other conditions for the memory device to operate, such as trim settings, redundancy implementations, optimal timing/biasing parameters, among others. Further, some of the nonvolatile memory elements (e.g., fuses, anti-fuses, blown capacitor devices, transistors with blown gate-oxide) are regarded as one-time programmable memory cells due to their irreversible programming characteristics. Thus, access to the nonvolatile memory elements (e.g., a fuse array) may permit a hostile or inadvertent actor to permanently alter the critical information (due to their irreversible programming characteristics), which in turn, result in harmful consequences to the performance or functionality of the memory device (e.g., by activating a test mode functionality that disables the memory device).

Similarly, various test modes of the memory device (e.g., the vendor-specific features or functions, the special features or functions selectively activated) may benefit from being protected against hostile or inadvertent actors, too. In some cases, securing access to the test modes prevent users from accessing certain aspects of the memory device's internal operations or prohibit unauthorized users from accessing special capabilities associated with the test modes (e.g., when the users did not pay for the special capabilities).

Additionally, securing access to the test modes can mitigate risks from modifying some voltages associated with the test modes, which may permanently damage certain devices or reduce the lifetime of the devices, if not properly managed. As such, access to the test modes needs to be strictly controlled. In some embodiments, various circuits and components that perform the DFT functions may be coupled to a common internal potential of the memory device, and controlled access to the DFT functions may be implemented via controlled access to the common internal potential.

Several embodiments of the present technology are directed to provide various levels of security against unauthorized access to the nonvolatile memory elements of a memory device—e.g., secure access to a fuse array (e.g., reading information from the fuse array, allowing changes to functions, test modes, or timings of the memory device defined in the fuse array). Although the present technology is described with respect to providing security to the fuse access functions and modules, the present technology is not limited thereto. For example, the security features described herein may be implemented to provide security to other modules or functions of the memory device such that only authenticated accesses to such modules or functions may be allowed, namely secure feature accesses for the memory device. The secure feature accesses may include secure accesses to the DFT functions, such as entries to test modes (e.g., directed to temporary changes to test modes), special feature modes or commands (e.g., allowing only a limited customer to have access to), mode registers and/or specialized registers, a nonvolatile memory space that could be either permanent (if based on one-time programmable elements) or flexible (if based on NAND memory cells or PCM cells), among others. In some embodiments, some of the special feature modes may be hidden (e.g., not described in a specification of the memory device) from a customer. Further, the fuse array may be replaced by (or provided in addition to) an array of other types of nonvolatile memory elements—e.g., one or more conductive layers (e.g., metal interconnect layers), metal switches, blown capacitor devices, transistors with blown gate-oxide, NAND memory cells, PCM cells, magnetic memory cells.

In some cases, a memory device may be configured to allow a customer (e.g., an authentic end-user who purchases the memory device from the manufacturer of the memory device) to select and store a user-defined access key (e.g., a first access key) in a fuse array of the memory device. The customer may use a special programming mode of the memory device (e.g., a post package repair (PPR) mode), which enables the customer or a memory vendor in some cases, to program a portion of the fuse array without directly accessing the fuse module. After the customer establishes the user-defined access key, the memory device may control accesses to the fuse array (or the DFT functions or other features of the DFT functions) based on the user-defined access key stored in the fuse array. The memory device may include a component (e.g., an authentication component) to permit or prohibit such accesses. For example, the memory device may receive an access command directed to the fuse array where the access command includes another access key (e.g., a second access key). The memory device (or the authentication component) may retrieve the user-defined access key from the fuse array upon receiving the access command to compare the user-defined access key with the second access key included in the access command. Thereafter, the memory device (or the authentication component) may determine whether to permit or prohibit execution of the access command at the fuse array based on comparing the user-defined access key with the second access key. In this manner, a third party—including the manufacturer of the memory device—who does not present a matching access key (e.g., the second access key matching the first access key) may be blocked from accessing the fuse array (e.g., reading information from the fuse array, altering information stored in the fuse array).

In some cases, a manufacturer may establish an access key based on a unique identification (or identifier) of a memory device. Such identification may be based on manufacturing information of the memory device—e.g., a production lot identification, a wafer identification within the production lot, a die location of the memory device within a wafer. The manufacturer may store the identification in a fuse array of the memory device (hence, the identification may be referred to as a fuse identification (FID)) such that the manufacturing information embedded in the identification is retained without a power supplied to the memory device. The FID may be stored at one address of the fuse array as a single entity or two or more addresses of the fuse array after having been partitioned into two or more portions. In some cases, the manufacturer may encode the FID before storing the FID—e.g., using a hash function. Further, the manufacturer may determine to use different sets of addresses to store the FIDs for different product groups to which the memory device belongs. As such, the memory device may be configured to control accesses to the fuse array (or the DFT functions or other features of the DFT functions) based on an FID-based access key. That is, a third party who does not know the predetermined set of addresses of the fuse array to read the FID and/or the encoding scheme (to decode the FID even after successfully reading the FID at the predetermined set of addresses) to obtain the FID may be blocked from accessing the fuse array when the memory device is configured to check whether an access command includes the accurate FID (e.g., the FID-based access key) to permit or prohibit accesses to the fuse array (or other secure features).

In some cases, a manufacturer of a memory device may define a secret access key (e.g., secret to any party other than the manufacturer, including an authentic end-user) for a fuse array (or the DFT functions or other features of the DFT functions) of the memory device and store the secret access key in a set of nonvolatile memory elements (e.g., the fuse array or in one or more conductive layers) of the memory device. Also, the manufacturer may establish a sequence of signals (e.g., a predetermined sequence of two or more commands directed to the memory device, a predetermined combination of two or more voltage levels as a function of time) such that the memory device may release the secret access key only upon receiving the sequence of signals. Further, the manufacturer may configure the memory device to transmit the secret access key using one or more pins that are designated for otherwise only receiving signals (e.g., address pins designated to receive address information from a host device) when releasing the secret access key. Accordingly, a host device (e.g., the manufacturer, a third party, a customer) coupled with the memory device is required to have prior knowledge of the sequence of signals to transmit to the memory device and which pins to monitor to receive the secret access key from the memory device—e.g., the pins the host device is otherwise configured to transmit signals to the memory device. As such, the host device and the memory device may need to be wired in a specific configuration based on such knowledge—e.g., using channels electrically coupling the host device with the memory device to enable successful release and receipt of the secret access key. Without receiving the secret access key from the memory device, the host device may be blocked from accessing the fuse array (or other secure features) when the memory device is configured to check for the secret access key to permit or prohibit accesses to the fuse array (or other secure features).

Figure 5:
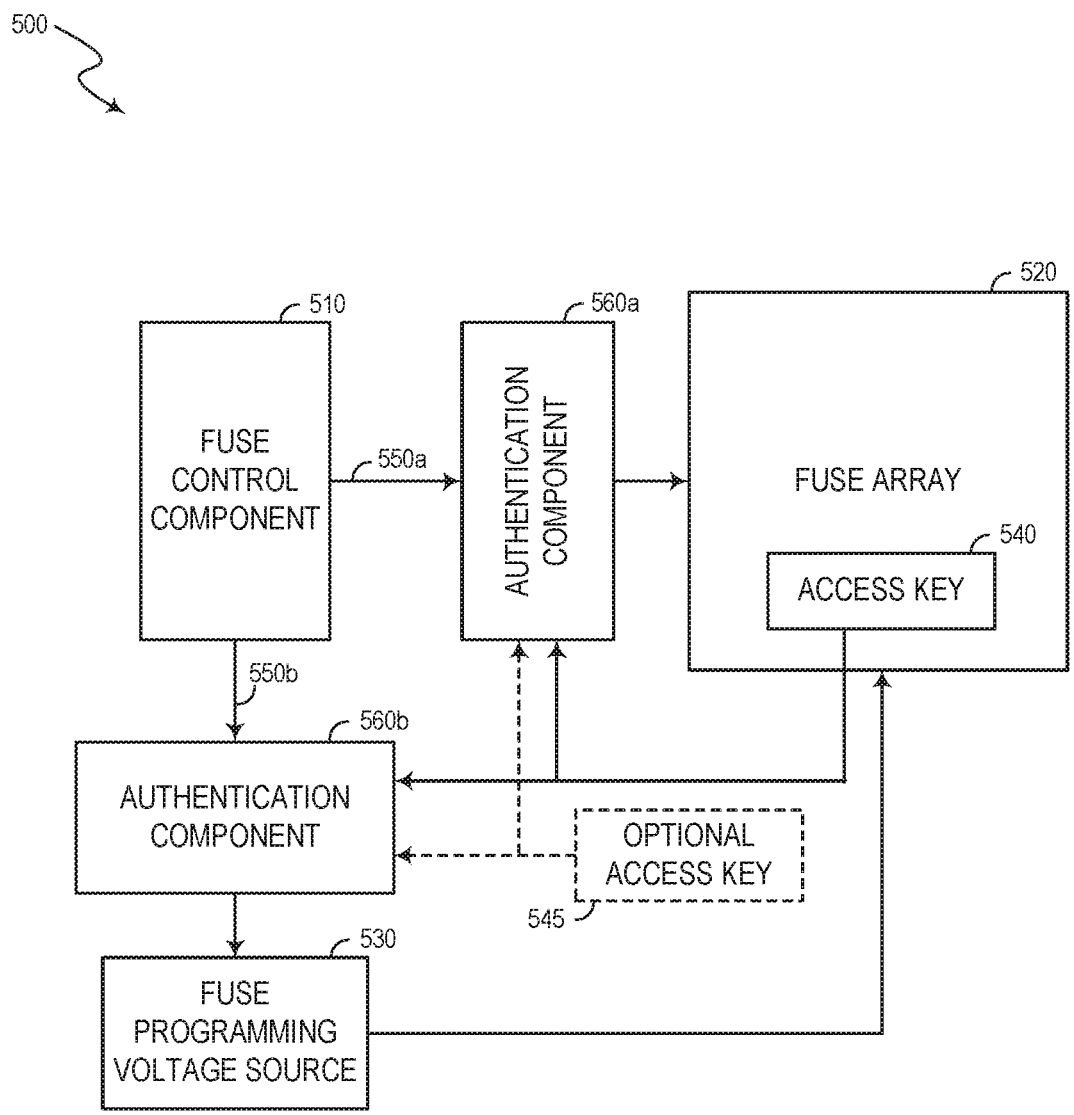
FIGS. 5 and 6 are block diagrams schematically illustrating circuit configurations of a memory device in accordance with embodiments of the present technology.
Figure 6:
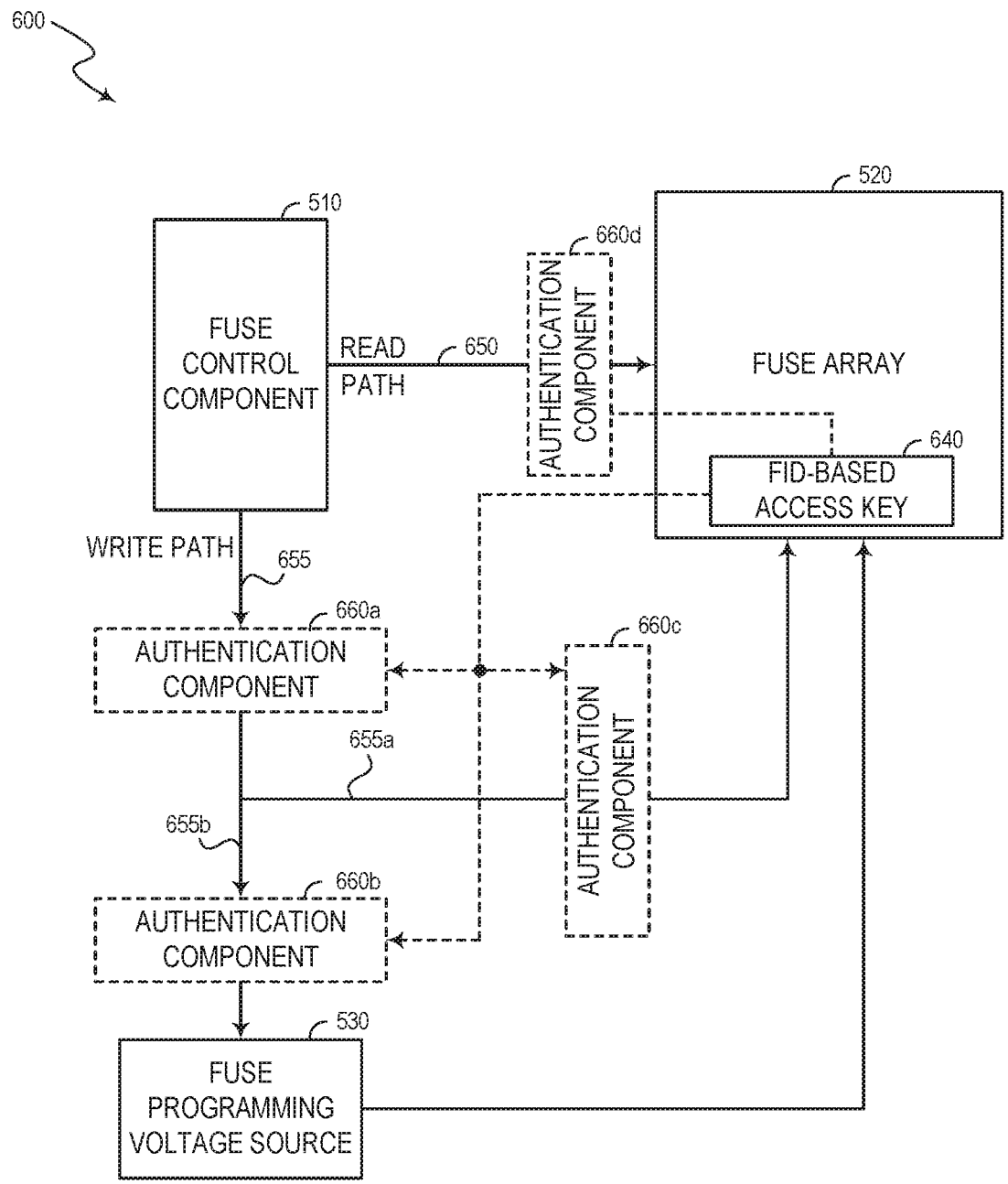

A memory device that supports an embodiment of the present technology is described with reference to FIG. 1. More detailed descriptions of an example secure access flow are provided with reference to FIG. 2. FIGS. 3 and 4 illustrate establishing access keys within the memory device in accordance with embodiments of the present technology. FIGS. 5 and 6 illustrate aspects of circuit configurations that implement the secure access keys in the memory device in accordance with embodiments of the present technology. A memory system that supports embodiments of the present technology is described with reference to FIG. 7. Flowcharts illustrating various methods of operating the memory device and memory system are described with reference to FIGS. 8 through 11.

FIG. 1 is a block diagram schematically illustrating a memory device 100 in accordance with an embodiment of the present technology. The memory device 100 may include an array of memory cells, such as memory array 150. The memory array 150 may include a plurality of banks (e.g., banks 0-15 in the example of FIG. 1), and each bank may include a plurality of word lines (WL), a plurality of bit lines (BL), and a plurality of memory cells (e.g., m×n memory cells) arranged at intersections of the word lines (e.g., m word lines, which may also be referred to as rows) and the bit lines (e.g., n bit lines, which may also be referred to as columns). Memory cells can include any one of a number of different memory media types, including capacitive, phase change, magnetoresistive, ferroelectric, or the like. The selection of a word line WL may be performed by a row decoder 140, and the selection of a bit line BL may be performed by a column decoder 145. Sense amplifiers (SAMP) may be provided for corresponding bit lines BL and connected to at least one respective local I/O line pair (LIOT/B), which may in turn be coupled to at least respective one main I/O line pair (MIOT/B), via transfer gates (TG), which can function as switches. The memory array 150 may also include plate lines and corresponding circuitry for managing their operation.

The memory device 100 may employ a plurality of external terminals that include command and address terminals coupled to a command bus and an address bus to receive command signals CMD and address signals ADDR, respectively. The memory device may further include a chip select terminal to receive a chip select signal CS, clock terminals to receive clock signals CK and CKF, data clock terminals to receive data clock signals WCK and WCKF, data terminals DQ, RDQS, DBI, and DMI, power supply terminals VDD, VSS, VDDQ, and VSSQ.

The command terminals and address terminals may be supplied with an address signal and a bank address signal from outside. The address signal and the bank address signal supplied to the address terminals can be transferred, via a command/address input circuit 105, to an address decoder 110. The address decoder 110 can receive the address signals and supply a decoded row address signal (XADD) to the row decoder 140 (which may be referred to as a row driver), and a decoded column address signal (YADD) to the column decoder 145 (which may be referred to as a column driver). The address decoder 110 can also receive the bank address signal (BADD) and supply the bank address signal to both the row decoder 140 and the column decoder 145. In some embodiments, the command/address input circuit 105 may be coupled with a test mode (TM) control circuit 175 and relay commands associated with various test mode functions thereto. In some cases, the test mode functions may be referred to as or include aspects of design-for-test (DFT) functions, such as trim setting functions (e.g., latching trim conditions without programming fuses), read/write timing functions, fuse access functions, built-in-self-test (BIST) functions, connectivity test functions, etc.

The TM control circuit 175 may perform various test mode functions that are defined by a manufacturer of the memory device 100. Such test mode functions may be used only by the manufacturer, not by a customer (e.g., an entity purchasing the memory device to build an apparatus including the memory device). For example, the manufacturer may perform a connectivity test that is designed to speed up testing of electrical continuity of pin interconnections between the memory device 100 and a host device (e.g., a memory controller). The TM control circuit 175 may be coupled to one or more registers 118 (which may be referred to as mode registers) in a command decoder 115. In some cases, the TM control circuit 175 may read the registers 118 to determine a specific test mode function to perform based on information stored in the registers 118. In other cases, the TM control circuit 175 may store information in the registers 118 such that other functional blocks in the memory device 100 may perform appropriate functions based on the information (e.g., information related to various test modes or DFT functions) stored in the registers 118.

The TM control circuit 175 may be coupled with a fuse array 180. The fuse array 180 includes an array of fuses that may be considered as one-time programmable nonvolatile memory elements. In some embodiments, the fuse array 180 may be replaced with an array of other nonvolatile memory elements, such as metal switches, blown capacitor devices, transistors with blown gate-oxide, NAND memory cells, PCM cells, magnetic memory cells. The fuse array 180 may store various operational information for the memory device 100 by programming one or more fuses therein, such as trim setting conditions including specific timing and/or voltage parameters, read/write clock conditions based on the read/write timing outcomes, control bits to enable or disable customer specific features or functionality, redundancy implementation information used for repairing a portion of the memory array 150, among others. In some cases, the fuses in the fuse array 180 may exhibit a high-resistance state (e.g., logic 0) upon fabricating the memory device 100—e.g., via an oxide layer disposed between two conductive layers. One or more fuses in the fuse array 180 may be programmed to exhibit a low-resistance state (e.g., logic 1) when a fuse programming voltage (or current) is applied across the one or more fuses—e.g., by physically altering (rupturing) the oxide layer by means of electrical stress such that the two conductive layers are connected via a conductive path. As such, once the fuses are programmed (e.g., the oxide layer is ruptured to exhibit a low-resistance state, logic 1), the programmed fuses may not be un-programmed (e.g., restoring their original high-resistance state, logic 0). In some cases, such fuses may be referred to as anti-fuses.

Moreover, the fuse programming voltage (or current) may correspond to a greater voltage (or current) than an operational voltage (or current) of circuits in the memory device 100 (e.g., the command/address input circuit 105, the address decoder 110, the command decoder 115) when the oxide layer included in the fuses may be the same oxide layer included in the circuits—e.g., a gate oxide of metal-oxide-semiconductor (MOS) transistors used to build the circuits. Accordingly, if the fuse programming voltage were supplied to the circuits, the fuse programming voltage may render the circuits irreparably damaged (e.g., the gate oxide of the MOS transistors may be damaged)—hence, the memory device 100 may become nonfunctional, in some cases. Accordingly, access to the TM control circuit 175 including the fuse programming capability needs to be strictly controlled to avoid undesired or nefarious programming of the fuse array 180 and/or unintended activation of the fuse programming voltage (or current). As described in greater details herein, the memory device 100 may be configured to include various schemes to provide secure access keys to the TM control circuit 175 (or other secure features) and/or to the fuse array 180.

The command and address terminals may be supplied with command signals CMD, address signals ADDR, and chip selection signals CS, from a memory controller. The command signals may represent various memory commands from the memory controller (e.g., including access commands, which can include read commands and write commands). The select signal CS may be used to select the memory device 100 to respond to commands and addresses provided to the command and address terminals. When an active CS signal is provided to the memory device 100, the commands and addresses can be decoded and memory operations can be performed. The command signals CMD may be provided as internal command signals ICMD to the command decoder 115 via the command/address input circuit 105. The command decoder 115 may include circuits to decode the internal command signals ICMD to generate various internal signals and commands for performing memory operations, for example, a row command signal to select a word line and a column command signal to select a bit line. The internal command signals can also include output and input activation commands, such as clocked command CMDCK.

The command decoder 115 may further include one or more registers 118 for tracking various counts or values (e.g., counts of refresh commands received by the memory device 100 or self-refresh operations performed by the memory device 100). In some embodiments, a subset of registers 118 may be referred to as mode registers and configured to store operational parameters to provide flexibility in performing various functions, features, and modes—e.g., test mode functions.

When a read command is issued and a row address and a column address are timely supplied with the read command, read data can be read from memory cells in the memory array 150 designated by these row address and column address. The read command may be received by the command decoder 115, which can provide internal commands to input/output circuit 160 so that read data can be output from the data terminals DQ, RDQS, DBI, and DMI via read/write amplifiers 155 and the input/output circuit 160 according to the RDQS clock signals. The read data may be provided at a time defined by read latency information RL that can be programmed in the memory device 100, for example, in a mode register (not shown in FIG. 1). The read latency information RL can be defined in terms of clock cycles of the CK clock signal. For example, the read latency information RL can be a number of clock cycles of the CK signal after the read command is received by the memory device 100 when the associated read data is provided.

When a write command is issued and a row address and a column address are timely supplied with the command, write data can be supplied to the data terminals DQ, DBI, and DMI according to the WCK and WCKF clock signals. The write command may be received by the command decoder 115, which can provide internal commands to the input/output circuit 160 so that the write data can be received by data receivers in the input/output circuit 160, and supplied via the input/output circuit 160 and the read/write amplifiers 155 to the memory array 150. The write data may be written in the memory cell designated by the row address and the column address. The write data may be provided to the data terminals at a time that is defined by write latency WL information. The write latency WL information can be programmed in the memory device 100, for example, in the mode register (not shown in FIG. 1). The write latency WL information can be defined in terms of clock cycles of the CK clock signal. For example, the write latency information WL can be a number of clock cycles of the CK signal after the write command is received by the memory device 100 when the associated write data is received.

The power supply terminals may be supplied with power supply potentials VDD and VSS. These power supply potentials VDD and VSS can be supplied to an internal voltage generator circuit 170. The internal voltage generator circuit 170 can generate various internal potentials VPP, VOD, VARY, VPERI, VPOP, and the like based on the power supply potentials VDD and VSS. The internal potential VPP can be used in the row decoder 140, the internal potentials VOD and VARY can be used in the sense amplifiers included in the memory array 150, and the internal potential VPERI can be used in many other circuit blocks. In some embodiments, the internal potential VPOP may be utilized as a fuse programming voltage that may be supplied to the fuse array 180.

The power supply terminal may also be supplied with power supply potential VDDQ. The power supply potential VDDQ can be supplied to the input/output circuit 160 together with the power supply potential VSS. The power supply potential VDDQ can be the same potential as the power supply potential VDD in an embodiment of the present technology. The power supply potential VDDQ can be a different potential from the power supply potential VDD in another embodiment of the present technology. However, the dedicated power supply potential VDDQ can be used for the input/output circuit 160 so that power supply noise generated by the input/output circuit 160 does not propagate to the other circuit blocks.

The clock terminals and data clock terminals may be supplied with external clock signals and complementary external clock signals. The external clock signals CK, CKF, WCK, WCKF can be supplied to a clock input circuit 120. The CK and CKF signals can be complementary, and the WCK and WCKF signals can also be complementary. Complementary clock signals can have opposite clock levels and transition between the opposite clock levels at the same time. For example, when a clock signal is at a low clock level a complementary clock signal is at a high level, and when the clock signal is at a high clock level the complementary clock signal is at a low clock level. Moreover, when the clock signal transitions from the low clock level to the high clock level the complementary clock signal transitions from the high clock level to the low clock level, and when the clock signal transitions from the high clock level to the low clock level the complementary clock signal transitions from the low clock level to the high clock level.

Input buffers included in the clock input circuit 120 can receive the external clock signals. For example, when enabled by a CKE signal from the command decoder 115, an input buffer can receive the CK and CKF signals and the WCK and WCKF signals. The clock input circuit 120 can receive the external clock signals to generate internal clock signals ICLK. The internal clock signals ICLK can be supplied to an internal clock circuit 130. The internal clock circuit 130 can provide various phase and frequency controlled internal clock signal based on the received internal clock signals ICLK and a clock enable signal CKE from the command/address input circuit 105. For example, the internal clock circuit 130 can include a clock path (not shown in FIG. 1) that receives the internal clock signal ICLK and provides various clock signals to the command decoder 115. The internal clock circuit 130 can further provide input/output (IO) clock signals. The IO clock signals can be supplied to the input/output circuit 160 and can be used as a timing signal for determining an output timing of read data and the input timing of write data. The IO clock signals can be provided at multiple clock frequencies so that data can be output from and input to the memory device 100 at different data rates. A higher clock frequency may be desirable when high memory speed is desired. A lower clock frequency may be desirable when lower power consumption is desired. The internal clock signals ICLK can also be supplied to a timing generator 135 and thus various internal clock signals can be generated.

The memory device 100 can be connected to any one of a number of electronic devices capable of utilizing memory for the temporary or persistent storage of information, or a component thereof. For example, a host device of memory device 100 may be a computing device such as a desktop or portable computer, a server, a hand-held device (e.g., a mobile phone, a tablet, a digital reader, a digital media player), or some component thereof (e.g., a central processing unit, a co-processor, a dedicated memory controller, etc.). The host device may be a networking device (e.g., a switch, a router, etc.) or a recorder of digital images, audio and/or video, a vehicle, an appliance, a toy, or any one of a number of other products. In one embodiment, the host device may be connected directly to memory device 100, although in other embodiments, the host device may be indirectly connected to memory device (e.g., over a networked connection or through intermediary devices).

In some cases, a memory device (e.g., the memory device 100) may include a fuse array configured to store a first access key (e.g., a user-defined access key), circuitry configured to generate control signals in response to receiving an access command directed to the fuse array, where the access command includes a second access key. The memory device may also include a component coupling the circuitry with the fuse array, where the component is configured to retrieve the first access key from the fuse array, compare the first access key with the second access key, and determine whether to permit or prohibit execution of the access command at the fuse array based on comparing the first access key with the second access key.

In some cases, a memory device (e.g., the memory device 100) may include a fuse array configured to store a first access key (e.g., an FID-based access key) at a predetermined set of addresses thereof, where the first access key is based on manufacturing information that identifies the memory device (e.g., a unique identifier of the memory device). The memory device may also include peripheral circuitry coupled to the fuse array and a memory device, and configured to generate an access command in response to receiving an access request directed to the fuse array, from a host device, where the access request includes a second access key. Additionally, the peripheral circuitry may be configured to retrieve the first access key from the fuse array, compare the first access key with the second access key, and determine whether to permit or prohibit execution of the access command at the fuse array based on comparing the first access key with the second access key.

In some cases, a memory device (e.g., the memory device 100) may include a set of nonvolatile memory elements configured to store a first access key (e.g., a secret access key). The set of nonvolatile memory elements may include one or more fuses of a fuse array, one or more conductive layers, or both. In some cases, the set of nonvolatile memory elements may include metal switches, blown capacitor devices, transistors with blown gate-oxide, NAND memory cells, PCM cells, magnetic memory cells. The memory device may further include peripheral circuitry coupled to the set of nonvolatile memory elements and a memory array, and configured to receive a predetermined sequence of signals from a host device, retrieve the first access key from the set of nonvolatile memory elements in response to receiving the predetermined sequence of signals, configure one or more pins to output the first access key, and transmit the first access key using the one or more pins after configuring the one or more pins.

Figure 2:
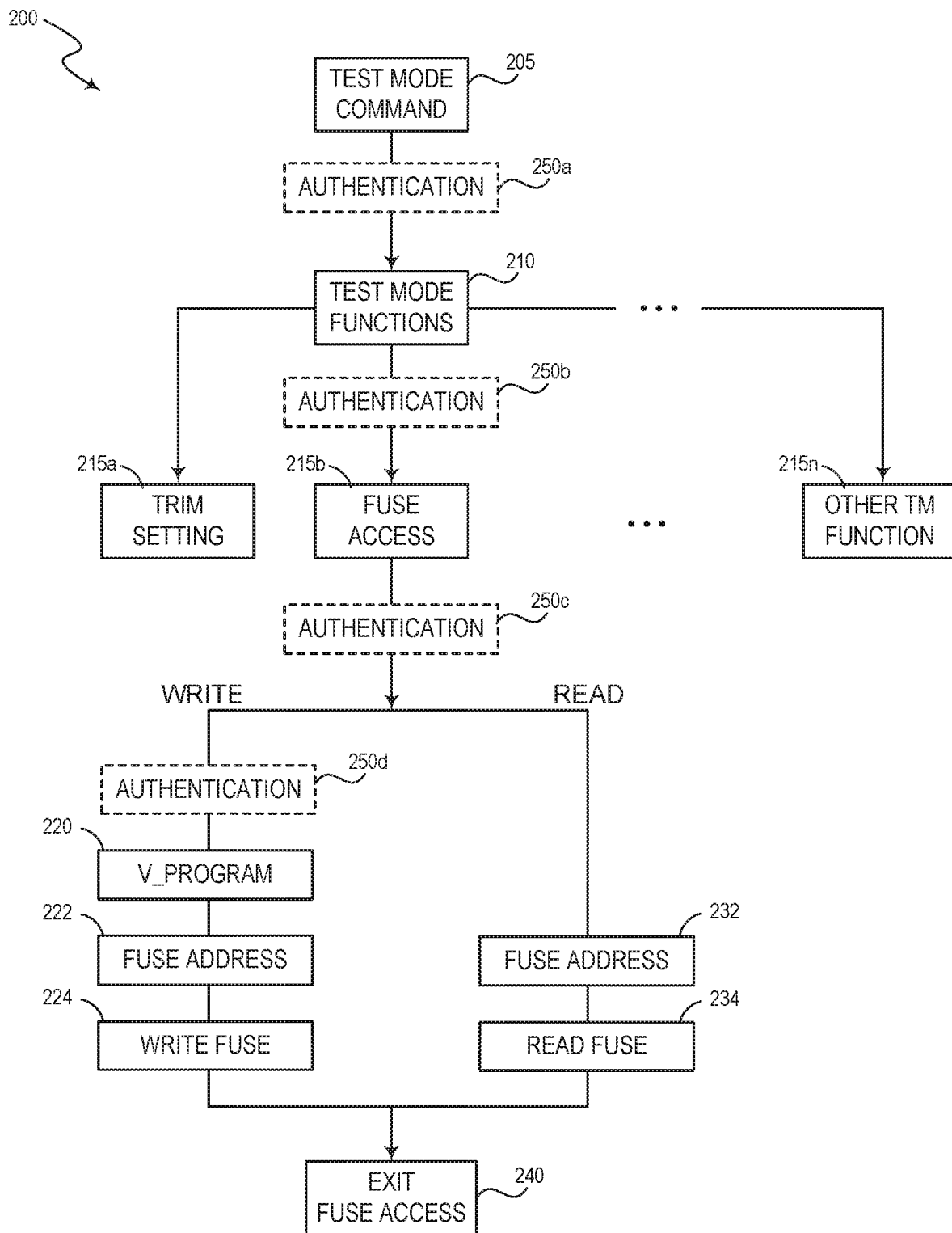
FIG. 2 is a block diagram schematically illustrating a secure access flow for a memory device in accordance with an embodiment of the present technology.

FIG. 2 is a block diagram 200 schematically illustrating an example secure access flow (e.g., an example secure feature access) for a memory device in accordance with an embodiment of the present technology. The block diagram 200 includes aspects of an operational sequence associated with providing various levels of security in carrying out test mode functions of the memory device 100 described with reference to FIG. 1. As described herein, the test mode functions may include a trim setting function (box 215*a*)—e.g., latching trim conditions without programming fuses, a fuse access function (box 215*b*), among others. Each box in the block diagram 200 may include aspects of one or more components or circuits described herein with reference to FIGS. 1 and 3 through 7. Such components or circuits may carry out various operations and/or functions designated to each box by performing one or more algorithms or routines. First, an overall synopsis of the operational sequence is described without referring to authentication components/steps indicated as boxes 250.

At box 205, a memory device (e.g., the memory device 100 described with reference to FIG. 1) may receive, from a host device, a command directed to test mode functions—e.g., via the address/command input circuit 105. The memory device (e.g., the address/command input circuit 105) may determine that the command is directed to the test mode functions and relay the command to the TM control circuit 175.

At box 210, the TM control circuit 175 may determine that the command is directed to perform a specific test mode function out of various test mode functions. For example, the TM control circuit 175 may determine that the command is directed to the fuse access function. Accordingly, the TM control circuit 175 may activate circuitry (e.g., the fuse control component 510 described with reference to FIGS. 5 and 6) configured to control fuse access function.

At box 215*b*, the circuitry (e.g., the fuse control component 510) may determine whether the command directed to the fuse access function is a read command or a write command. Subsequently, the circuitry may generate control signals including one or more addresses of fuses of the fuse array 180, a read command associated with the one or more addresses, or a write command associated with the one or more addresses.

When the command corresponds to a write command, at box 220, the circuitry may activate (e.g., enable) a fuse programming component (e.g., the fuse programming voltage source 530) such that a fuse programming voltage (or current) becomes available to program one or more fuses of the fuse array 180. Further, at box 222, the circuitry may identify the one or more fuses by providing the one or more addresses of the fuses to the fuse array 180. At box 224, the circuitry may program (e.g., write) the one or more identified fuses of the fuse array 180 by applying the fuse programming voltage—e.g., electrically stress the fuse to exhibit a low-resistance once programmed. Subsequently, at box 240, the circuitry may exit (or terminate) the fuse access function after programming the one or more fuses.

Similarly, when the command is a read command, at box 232, the circuitry may identify the one or more fuses to be read by providing the one or more addresses of the fuses of the fuse array 180. At box 234, the circuitry may read the one or more identified fuses of the fuse array 180. Subsequently, at box 240, the circuitry may exit (or terminate) the fuse access function after reading the one or more fuses.

The block diagram 200 illustrates one or more authentication steps/components indicated as boxes 250 in the operational sequence to provide various levels of security in accessing test mode functions (e.g., the fuse access function). In this regard, the memory device may be configured to store a first access key in nonvolatile memory elements of the memory device. In some embodiments, a customer may determine and store the first access key in the fuse array 180 (e.g., the user-defined access key). In some embodiments, a manufacturer of the memory device may store the first access key at a predetermined set of addresses of the fuse array 180, where the first access key is determined based on manufacturing information that identifies the memory device 100 (e.g., the FID-based access key). In some embodiments, the manufacturer of the memory device defines the first access key hidden from a third party (e.g., the secret access key) and stored at a set of nonvolatile memory elements of the memory device 100 (e.g., a set of fuses, a set of conductive layers). Such hidden access key may be available via one or more pins of the memory device, which are designated for otherwise receiving inputs only.

Further, the command received from the host device (box 205) may include a second access key, in some cases. The authentication steps/components at one or more boxes 250 may retrieve the first access key stored within the memory device (e.g., the fuse array 180, one or more conductive layers of the memory device 100) and compare the first access key and the second access key included in the command. Thereafter, the authentication steps/components may determine whether to permit or prohibit further execution of the command based on the comparison.

In some embodiments, at box 250a, the memory device 100 may perform the authentication step in response to receiving the command directed to the test mode functions. When the first access key does not match the second access key, the command may be prohibited to reach the TM control circuit 175 that determines which specific test mode function that the command is directed to (box 210). Accordingly, an access to the test mode functions may be blocked at the outset when the command does not include the second access key matching the first access key.

In some embodiments, at box 250b, the memory device 100 may perform the authentication step after determining that the command is directed to the fuse access function. When the second access key included in the command does not match the first access key, the command may be blocked from reaching the circuitry configured to control fuse access functions (e.g., the fuse control component 510). Accordingly, the circuitry configured to control the fuse access functions may not be activated.

In some embodiments, at box 250c, the memory device 100 may perform the authentication step after activating the circuitry (e.g., the fuse control component 510). When activated, the circuitry may generate control signals directed to the fuse array 180, such as one or more addresses of fuses of the fuse array, a read command associated with the one or more addresses, a write command associated with the one or more addresses, or a combination thereof. When the second access key included in the command does not match the first access key, the control signals may be blocked from reaching the fuse array 180, hence blocking the fuse access function from reaching the fuse array 180.

In some embodiments, at box 250d, the memory device 100 may perform the authentication step after determining that the fuse access function is directed to writing information at the fuse array. When the second access key included in the command does not match the first access key, the fuse program voltage component may be disabled (not activated) to provide a fuse programming voltage to the fuse array (box 220). Accordingly, a write command may be blocked at the fuse array—e.g., fuses may not be programmed without the fuse programming voltage available to the fuse array 180. Further, when the memory device 100 performs authentication step at box 250d, a read command directed to the fuse array 180 may be performed without any authentication if there are no other authentication steps implemented—e.g., at box 250a, at box 250b, at box 250c.

Figure 3A:
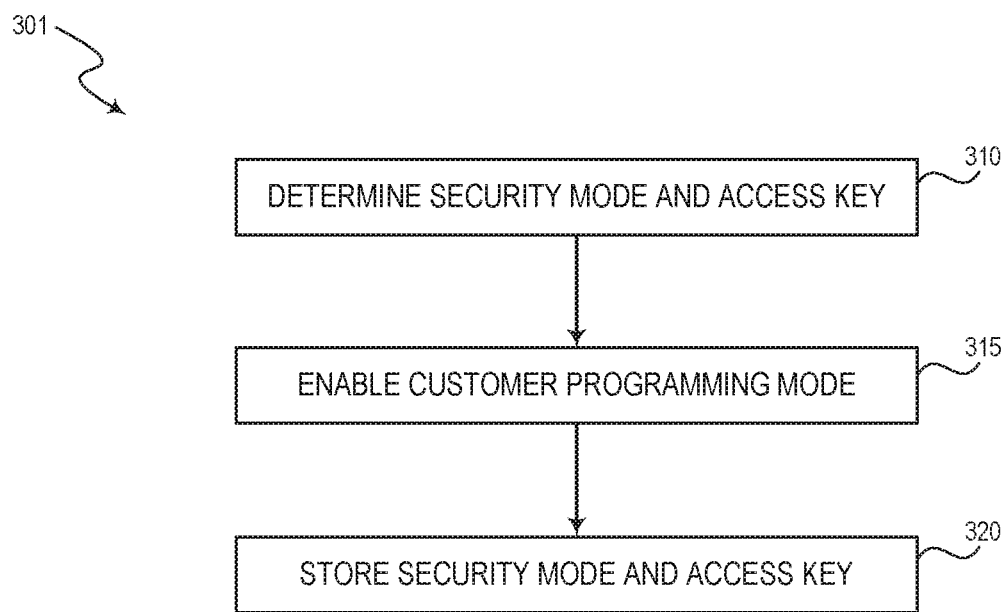
FIG. 3a shows a flow chart illustrating a method of establishing an access key and a security mode for a memory device and FIG. 3b shows a schematic configuration illustrating the access key and the security mode in accordance with embodiments of the present technology.
Figure 3B:
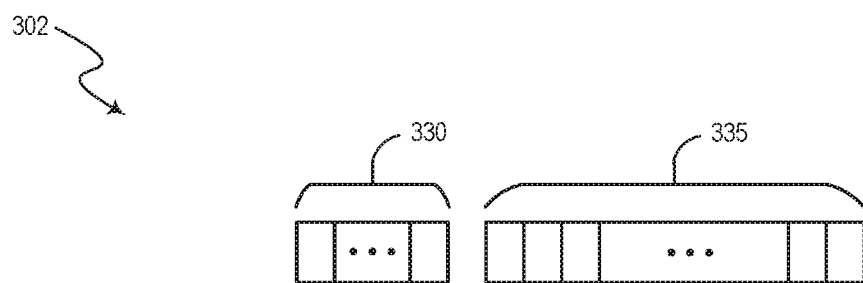

FIG. 3a shows a flow chart 301 illustrating a method of establishing an access key and a security mode for a memory device and FIG. 3b shows a schematic configuration 302 illustrating the access key and the security mode in accordance with embodiments of the present technology. The flow chart 301 illustrates an example procedure for a customer to establish a user-defined access key—e.g., customers selected by the vendor, customers who pay for this secure feature access. The schematic configuration 302 illustrates security information that the customer may define, such as a user-defined access key 335 and a security mode 330 associated with the user-defined access key 335. The flow chart 301 and the schematic configuration 302 may include aspects of the secure access flow depicted in the block diagram 200 that provides various levels of security for carrying out test mode functions of the memory device 100 described with reference to FIGS. 1 and 2.

In some cases, the customer may define and store the security information in a fuse array of a memory device (e.g., the fuse array 180 described with reference to FIG. 1) using a special programming mode (e.g., the PPR mode) that allows the customer to program a portion of the fuse array without directly executing the fuse access function. In some embodiments, such a portion may be limited to a few specific locations of the fuse array (e.g., one or more specific addresses of fuses in the fuse array, which may be communicated to the customer in a datasheet table, in some cases). In some cases, such a special programming mode may be referred to as a customer programming mode. For example, under the customer programming mode, the customer may select a set of fuses in the fuse array to store the security information (e.g., providing one or more addresses of fuses in the fuse array to identify which fuses to program, in some cases). Subsequently, a state machine (e.g., the control circuitry 706) of the memory device 100, on behalf of the customer, may carry out programming of the set of fuses in conjunction with other circuitry controlling the fuse array (e.g., the TM control circuit 175, the fuse control component 510) without the customer directly invoking the fuse access function.

The flow chart 301 illustrates the customer determining the security information including a security mode 330 and a user-defined access key 335 (box 310). Also, the customer may select a set of fuses of the fuse array 180 to store the security information using the PPR mode or the customer programming mode. Thereafter, the customer may enable the customer programming mode and provide the security information to the memory device 100 (box 315). Subsequently, the memory device 100, on behalf of the customer, may utilize the fuse access function to store the security information (e.g., the security mode 330 and the user-defined access key 335) at the selected set of fuses of the fuse array 180 (box 320). In some cases, the customer may provide locations of the set of fuses available for the customer to program based on a datasheet table listing one or more specific addresses of fuses in the fuse array.

The user-defined access key 335 may include any number of bits (e.g., k-bits) that the customer may desire, within the storage space of the fuse array (or other nonvolatile memory elements) available to the customer. For example, the user-defined access key 335 may include 64-bits, 128-bits, 256-bits, or more. In general, there may be a trade-off between a strength of security (e.g., a greater number of bits in the user-defined access key 335, the stronger protection against an unauthorized access) and an efficiency of the memory device 100 (e.g., storing and retrieving the user-defined access key 335, comparing the user-defined access key 335 with another access key included in an access command) in determining the number of bits of the user-defined access key 335.

The security mode 330 may designate at which level the memory device 100 may trigger the user-defined access key 335 to permit or prohibit a command directed to the fuse access function (or other secure features accesses) from reaching a next stage. For example, Table 1 illustrates various levels of security using two (2) bits of security mode 330.

TABLE 1

| Security Mode | Level of security selected |
| --- | --- |
| 00 | Unlocked: access security not implemented |
| 01 | Lock fuse read only |
| 10 | Lock fuse write only |
| 11 | Lock fuse access (both read and write) |

For example, when the security mode 330 corresponds to "10," accessing the fuse array may be blocked when the access command is a write command. That is, when the customer programs the security mode 330 to have "10," the memory device 100 implements the authentication step at box 250d as described with reference to FIG. 2. As such, when the security mode 330 corresponds to "10," a fuse programming component (e.g., the fuse programming voltage source 530) coupled to the fuse array and configured to generate a fuse programming voltage may be disabled to block the write command (e.g., box 220 described with reference to FIG. 2).

Similarly, when the security mode 330 corresponds to "11," accessing the fuse array may be blocked regardless of the access command being a write command or a read command. That is, the security mode 330 of "11" may correspond to the memory device 100 implementing the authentication step at box 250c (or the authentication step at box 250b) as described with reference to FIG. 2. Table 1 depicts the security mode including 2-bits for illustration purposes, but the present disclosure is not limited thereto. For example, the security mode 330 may include 3 bits, 4 bits, or even more to designate various levels where the security feature (e.g., the authentication step) may be implemented.

In some cases, a single user-defined access key 335 having k-bits may be common to different security modes. For example, the single user-defined access key 335 may be used to prohibit the access command at the authentication step at box 250c (when the security mode 330 corresponds to "11") or at the authentication step at box 250d (when the security mode 330 corresponds to "10"). In some cases, different access keys may be assigned to different security modes, respectively. For example, a user-defined access key 335 (e.g., "101 . . . 10") may be used to prohibit the access command at the authentication step at box 250c (when the security mode 330 corresponds to "11"), and a different user-defined access key 335 (e.g., "111 . . . 00") may be used to prohibit the access command at the authentication step at box 250d (when the security mode 330 corresponds to "10"). In some cases, different user-defined access keys 335 may have different quantities of bits.

Figure 4A:
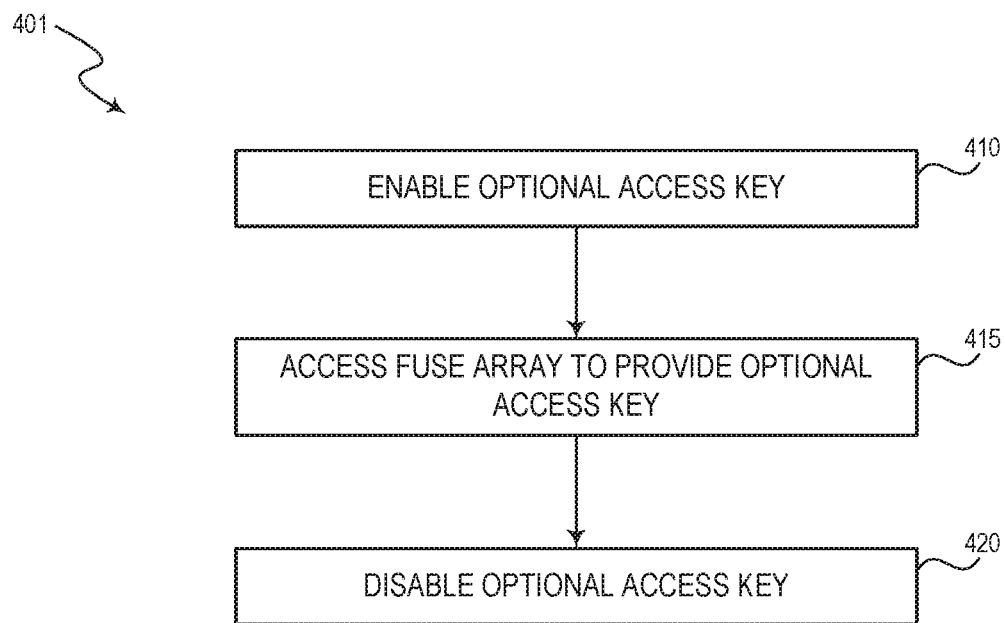
FIG. 4a shows a flow chart illustrating a method of using an optional access key and a status indicator for a memory device and FIG. 4b shows a schematic configuration illustrating the optional access key and the status indicator in accordance with embodiments of the present technology.
Figure 4B:
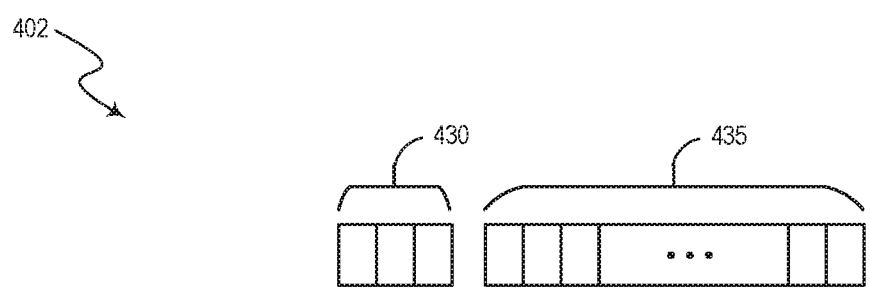

FIG. 4a shows a flow chart 401 illustrating a method of using an optional access key and a status indicator for a memory device and FIG. 4b shows a schematic configuration 402 that includes the optional access key 435 and the status indicator 430 for the optional access key 435. The flow chart 401 illustrates an example procedure utilizing the optional access key in addition to an access key (e.g., the user-defined access key) to facilitate additional security features. The flow chart 401 and the schematic configuration 402 may include aspects of the secure access flow depicted in the block diagram 200 that provides various levels of security for carrying out test mode functions of the memory device 100 described with reference to FIGS. 1 and 2.

In some cases, a manufacturer of the memory device 100 may define and store the optional access key 435 in the fuse array (or nonvolatile memory elements). The optional access key 435 may be established prior to shipping the memory device 100 to a customer. As such, the memory device may include the optional access key 435 in addition to the user-defined access key 335 defined by the customer as described with reference to FIG. 3. The status indicator 430 may indicate whether the optional access key 435 is enabled or disabled based on various situations associated with the memory device 100. For example, when the memory device 100 is shipped to the customer, the status indicator 430 may be set to indicate that the optional access key 435 is disabled—e.g., the optional access key 435 defined by the manufacturer is not allowed to override the user-defined access key 335 defined by the customer.

In some cases, the customer may ship the memory device 100 back to the manufacturer after having stored the user-defined access key 335 such that the manufacture may perform certain analytical tasks that require accesses to the fuse array (or the nonvolatile memory elements). In some cases, such an analytical task that the manufacturer performs may be referred to as a return-material-analyses (RMA) procedure. Further, the customer may not desire to share the user-defined access key 335 with the manufacturer. In such cases, the customer may program (alter or modify) the status indicator 430 to indicate that the optional access key 435 is enabled (box 410)—e.g., the optional access key 435 defined by the manufacture overrides the user-defined access key 335 defined by the customer. The manufacturer may provide the optional access key 435 from the fuse array (box 415) and override the user-defined access key 335 to carry out various RMA tasks utilizing information stored within the fuse array. When the customer receives the memory device 100 from the manufacturer after the RMA tasks, the customer may program the status indicator 430 to indicate that the optional access key 435 is disabled (box 420) such that access to the fuse array may be allowed only by using the user-defined access key 335 defined by the customer.

The status indicator 430 may be configured to indicate whether the optional access key 435 is disabled or enabled. For example, Table 2 illustrates various indications using three (3) bits (e.g., $b_2$ $b_1$ $b_0$) of the status indicator 430.

TABLE 2

| Status ($b_2$ $b_1$ $b_0$) | Description |
| --- | --- |
| x00 | Optional access key disabled |
| x01 | Optional access key enabled |
| x10 | Optional access key enabled |
| x11 | Optional access key disabled |
| 1xx | Optional access key permanently disabled |

Table 2 illustrates that two right-most bits ($b_1 b_0$) of the status indicator 430 may indicate whether the optional access key 435 is enabled or disabled. For example, when the memory device 100 is shipped to the customer, $b_1 b_0$ may correspond to "00" to indicate that the optional access key 435 is disabled. When the memory device 100 is shipped back to the manufacture to perform the RMA procedure, one of the two right-most bits ($b_1 b_0$) of the status indicator 430 may be altered to "1" from "0" such that $b_1 b_0$ (e.g., either "10" or "01") may indicate that the optional access key 435 is enabled. In some cases, an exclusive-OR (XOR) function may be carried out using the two right-most bits, $b_1$ and $b_0$, to determine whether the optional access key 435 is enabled or disabled. When the memory device 100 is shipped back to the customer after completing the RMA procedure, a remaining bit of the two right-most bits ($b_1$ or $b_0$) of the status indicator 430 may be programed to "1" from "0" such that the two right-most bits ($b_1 b_0$) correspond to "11" to indicate that the optional access key 435 is disabled.

Moreover, the most significant bit ($b_2$) of the status indicator 430 may be set (programmed to "1") to indicate that the optional access key 435 is disabled permanently regardless of the logic state of the two right-most bits ($b_1$ and $b_0$). For example, when the customer foresees no RMA procedure necessary in the future, the most significant bit ($b_2$) of the status indicator 430 may be set (e.g., programmed) to "1." Table 2 depicts the status indicator 430 including 3-bits for illustration purposes, but the present disclosure is not limited thereto. For example, the status indicator 430 may include 4 bits, 5 bits, or even more. Additionally, the bit indicating the optional access key 435 is permanently disabled may be any bit or bits of the status indicator 430.

FIG. 5 is a block diagram 500 schematically illustrating a circuit configuration of a memory device in accordance with an embodiment of the present technology. The block diagram 500 may include aspects of circuits and components of the memory device 100 that are associated with test mode functions and the fuse array described with reference to FIG. 1. The block diagram 500 includes a fuse control component 510 (which may be an example of or include aspects of the TM control circuit 175), a fuse array 520 (which may be an example of or include aspects of the fuse array 180), and a fuse programming voltage source 530 (which may be an example of or include aspects of the internal potential VPERI or VPOP described with reference to FIG. 1). Also, the block diagram 500 illustrates one or more authentication components 560 (e.g., an authentication component 560a along a channel 550a, an authentication component 560b along a channel 550b) that may be configured to determine whether to permit or prohibit access commands to the fuse array 520. In some embodiments, the fuse control component 510, the fuse programming voltage source 530, authentication components 560, or any combination thereof may be collectively referred to as peripheral circuitry. Further, the peripheral circuit may be coupled to a memory array (e.g., the memory array 150) of the memory device.

The fuse array 520 may be configured to store an access key 540 (e.g., a first access key). In some cases, the access key 540 may be an example of or include aspects of an access key defined and stored by the customer (e.g., the user-defined access key 335 described with reference to FIG. 3). As such, the access key 540 may be associated with a security mode (e.g., the security mode 330 as described with reference to FIG. 3). In some cases, the access key 540 may be an example of or include aspects of an access key defined and stored by the manufacturer (e.g., the secret access key configured to be transmitted using one or more pins that are designated for otherwise only receiving signals). In some cases, at least a portion of the access key 540 may be stored at one or more conductive layers of the memory device instead of at the fuse array 520. Moreover, the block diagram 500 illustrates an optional access key 545, which may be an example of or include aspects of the optional access key 435 described with reference to FIG. 4. As such, the optional access key 545 may be associated with the status indicator 430 described with reference to FIG. 4. In some cases, at least a portion of the optional access key 545 may be stored at one or more conductive layers of the memory device as illustrated in the block diagram 500. In some cases, the optional access key 545 may be stored in the fuse array 520 (or nonvolatile memory elements) or in another fuse array (not shown) of the memory device. In some cases, the optional access key 545 may be stored in a register (e.g., the register 118) of the memory device.

The fuse control component 510 may be configured to generate control signals for the fuse array 520 in response to receiving an access command directed to the fuse array 520. The control signals may include one or more addresses of fuses of the fuse array 520, a read command associated with the one or more addresses, a write command associated with the one or more addresses, or a combination thereof. The control signals may be transmitted to the fuse array 520 via a channel 550a. The access command may include a second access key provided by a host-device of a system that includes the memory device 100. Further, when a write command to the fuse array 520 is issued, the fuse control component 510 may be configured to generate control signals directed to the fuse programming voltage source 530—e.g., an additional functionality associated with the write command to enable the fuse programming voltage (e.g., VPOP described with reference to FIG. 1). Such control signals may be transmitted to the fuse programming voltage source 530 via a channel 550b.

In some cases (e.g., authenticating a read command directed to the fuse array 520), a component 560a ("an authentication component 560a") may be located between the fuse control component 510 and the fuse array 520, and electrically couple the fuse control component 510 with the fuse array 520. The component 560a may be configured to retrieve the access key 540 from the fuse array 520 to compare with the second key included in the access command. Further, the component 560a may determine whether to permit or prohibit execution of the access command at the fuse array 520 based on comparing the access key 540 with the second access key. That is, when the second access key does not match with the access key 540, the component 560a may block the control signals from reaching the fuse array 520.

In some cases (e.g., authenticating a write command directed to the fuse array 520), a component 560b ("an authentication component 560b") may be located between the fuse control component 510 and the fuse programming voltage source 530, and electrically couple the fuse control component 510 with the fuse programming voltage source 530. Similar to the component 560a, the component 560b may be configured to retrieve the access key 540 from the fuse array 520 to compare with the second key included in the access command. Further, the component 560b may determine whether to permit or prohibit execution of the access command at the fuse array 520 based on comparing the access key 540 with the second access key. That is, when the second access key does not match with the access key 540, the component 560b may prevent the fuse control component 510 from activating (e.g., enabling) the fuse programming voltage source 530 (or disable the fuse programming voltage source 530) that is coupled with the fuse array. The fuse programming voltage source 530 may be configured to generate a fuse programming voltage. In some cases, the fuse programming voltage may be greater than an operating voltage of the fuse control component 510 or the component 560a and/or 560b. When the fuse programming voltage source 530 is disabled (e.g., deactivated), the write command directed to the fuse array 520 is prevented at the fuse array 520 due to absence of a fuse programming voltage that is necessary to program fuses of the fuse array 520.

In some cases, the access key 540 may be associated with a security mode (e.g., the security mode 330 described with reference to FIG. 3). Based on the security mode 330, the memory device 100 (e.g., the TM control circuit 175, the fuse control component 510, the control circuitry 706) may determine at which level the security feature may be implemented. For example, when the security mode 330 corresponds to "11," the memory device may block the control signals (e.g., read command, write command) from reaching the fuse array 520 by activating the authentication component 560a located between the fuse control component 510 and the fuse array 520—e.g., the authentication step implemented at box 250c as illustrated in FIG. 2. Additionally or alternatively, when the security mode 330 corresponding to "10," the memory device may prohibit the fuse control component 510 from activating (e.g., enabling) the fuse programming voltage source 530 (or keep the fuse programming voltage source 530 disabled) by activating the authentication component 560b located between the fuse control component 510 and the fuse programming voltage source 530—e.g., the authentication step implemented at box 250d as illustrated in FIG. 2.

In some cases, the fuse control component 510 may be included in the TM control circuit 175 that is configured to perform other test mode functions different from the fuse access function—e.g., the trim setting function without programming fuses, special feature enabling function. When the second access key does not match with the access key 540, the TM control circuit 175 may be disabled from performing all the test mode functions including the fuse access function—e.g., the authentication step implemented at box 250a as illustrated in FIG. 2.

In some cases, the memory device 100 may include the optional access key 545 in addition to the access key 540. In such cases, the authentication components 560 may be configured to retrieve the optional access key 545 and update the access key 540 with the optional access key 545 before comparing the access key 540 with the second access key included in the access command. In some cases, updating the access key 540 with the optional access key 545 may include replacing the access key 540 with the optional access key 545. In other cases, updating the access key 540 with the optional access key 545 may include concatenating the optional access key 545 to the access key 540 as part of the access key 540.

FIG. 6 is a block diagram 600 schematically illustrating a circuit configuration of a memory device in accordance with an embodiment of the present technology. The block diagram 600 may include aspects of circuits and components of the memory device 100 that are associated with test mode functions and the fuse array described with reference to FIG. 1. Further, the block diagram 600 includes several components described with reference to FIG. 5, such as the fuse control component 510, the fuse array 520, and the fuse programming voltage source 530. The block diagram 600 illustrates one or more authentication components 660 that may be positioned in various locations to control (e.g., permit or prohibit) accesses to the fuse array 520. In some embodiments, the fuse control component 510, the fuse programming voltage source 530, authentication components 660, or any combination thereof, may be collectively referred to as peripheral circuitry. Further, the peripheral circuitry may be coupled to a memory array (e.g., the memory array 150) of the memory device 100.

In some cases, the manufacturer of the memory device 100 may define an access key using a fuse identification (FID) that is unique to the memory device 100, hence an FID-based access key 640. The manufacturer may determine to utilize the FID-based access key 640 to implement security features in lieu of providing a customer an option to define an access key as described with reference to FIG. 3. The FID may be unique to each individual memory device 100 because an FID includes metadata comprising various manufacturing information associated with the individual memory device 100, such as a product identification, a design revision identification, a production site identification, a production lot identification, a wafer identification within the production lot, a die location of the memory device within the wafer, or a combination thereof. In some cases, an FID may be regarded as a unique identification (or identifier) including a serial number comprising approximately sixty (60) to hundred (100) or more bits that identifies each individual memory device 100 based on the manufacturing information.

The FID-based access key 640 may be the FID itself or a modified version of the FID—e.g., encoded FID using a hash function, in some embodiments. The manufacturer may store the FID-based access key 640 at a predetermined set of addresses of the fuse array 520 to achieve a level of obfuscation to protect the FID-based access key 640 from a third party—e.g., partitioning the FID-based access key 640 to multiple portions that each correspond to individual addresses of the predetermined set of addresses. Accordingly, encoding the FID-based access key 640 may be carried out by partitioning the FID-based access key 640 to multiple portions that each correspond to individual addresses of the predetermined set of addresses, modifying the FID-based access key 640 using a hash function, or both. The predetermined set of addresses may be selected based on parameters associated with the memory device 100 such as a product identification, a design revision identification, a memory capacity, an operating voltage, a package type, an operating clock rate, an operating temperature range, or a combination thereof. As such, a first category of memory devices may have a first set of predetermined addresses to store FID-based access keys 640 and a second category of memory devices may have a second set of predetermined addresses to store FID-based access keys 640.

Thus, without prior knowledge of the predetermined set of addresses within the fuse array 520 associated with the memory device 100 and/or the hash function used to encode the FID-based access key 640, the FID-based access key 640 is difficult for a third party to retrieve (and decode) by random attempts. In some cases, the manufacturer may choose to provide information regarding how to retrieve the FID-based access key 640 from the fuse array 520 to a customer of the memory device (e.g., the predetermined set of addresses, the hash function used to encode) such that the customer may have access (e.g., write command) to the fuse array 520. In other cases, the manufacturer may choose not to provide such information and limit the customer's access to the fuse array 520—e.g., restricting the customer to the PPR mode.

Under the scheme of using the FID-based access key 640, a read command to the fuse array 520 may not be gated by an authentication component (e.g., an authentication component 660*d* may be deactivated) at least when a host device (e.g., the manufacturer of the memory device 100) needs to retrieve and decode the FID-based access key 640 from the fuse array 520 at the onset of the fuse access function. Once the FID-based access key 640 is retrieved successfully, subsequent access commands (e.g., read command, write command) including the FID-based access key 640 may be issued to the memory device 100 to execute the access commands directed to the fuse array 520.

Referring to the block diagram 600, when an access command directed to the fuse array 520 corresponds to a read command directed to the fuse array 520, the fuse control component 510 may be configured to generate a first set of signals (e.g., one or more addresses of fuses of the fuse array 520, the read command associated with the one or more addresses) in response to receiving the access command. The first set of signals may be transmitted to the fuse array 520 via channel 650 that may be referred to as a read path. As described above, no authentication (or gating) may be implemented on the read path 650, in some cases—e.g., when the host device retrieves the FID-based access key 640 from the fuse array at the onset of the fuse access function. Once the host device has retrieved the FID-based access key 640, subsequent read commands may be gated (e.g., the authentication component 660*d* is activated). For example, a read command may include a second access key and the authentication component 660*d* may retrieve the FID-based access key 640 from the fuse array 520 to compare with the second access key included in the read command. Further, the authentication component 660*d* may determine whether to permit or prohibit execution of the read command at the fuse array 520 based on comparing the FID-based access key 640 with the second access key.

When an access command directed to the fuse array 520 corresponds to a write command directed to the fuse array 520, the fuse control component 510 may be configured to generate a second set of signals (e.g., one or more addresses of fuses of the fuse array 520, the write command associated with the one or more addresses) in response to receiving the access command. The second set of signals may be transmitted to the fuse array 520 via channel 655*a*. The fuse control component 510 may transmit an additional signal to the fuse programming voltage source 530 via channel 655*b*. Channels 655 may be collectively referred to as a write path. The write command may include a second access key provided by the host device. The block diagram 600 also illustrates additional authentication components 660 disposed at various locations along the write path 655 (e.g., authentication component 660*a*, authentication component 660*b*, authentication component 660*c*) to protect contents of the fuse array 520 from unauthenticated modifications.

The authentication components 660*a* through 660*c* may be configured to receive the write command, as well as the second access key included in the write command from the fuse control component 510. The authentication components 660*a* through 660*c* may retrieve the FID-based access key 640 from the fuse array 520 in response to receiving the write command to compare the FID-based access key 640 and the second access key. Further, the authentication components 660*a* through 660*c* may determine whether to permit or prohibit execution of the write command at the fuse array 520 based on comparing the FID-based access key 640 with the second access key.

In some cases, the authentication component 660*a* may be located at the write path (e.g., channel 655). When the second access key does not match the FID-based access key 640, the authentication component 660*a* may nullify (e.g., block) the write command at the onset of the write path. In some cases, the authentication component 660*b* may be located between the fuse control component 510 and the fuse programming voltage source 530, and electrically couple the fuse control component 510 with the fuse programming voltage source 530. When the second access key does not match the FID-based access key 640, the authentication component 660*b* may prohibit the fuse control component 510 from activating (e.g., enabling) the fuse programming voltage source 530 (or disable the fuse programming voltage source 530) that is coupled with the fuse array 520. In some cases, the authentication component 660*c* may be located between the fuse control component 510 and the fuse array 520, and electrically couple the fuse control component 510 and the fuse array 520. When the second access key does not match the FID-based access key 640, the authentication component 660*c* may block the write command (e.g., the second set of signals associated with the write command via the channel 655*a*) from reaching the fuse array 520.

Figure 7:
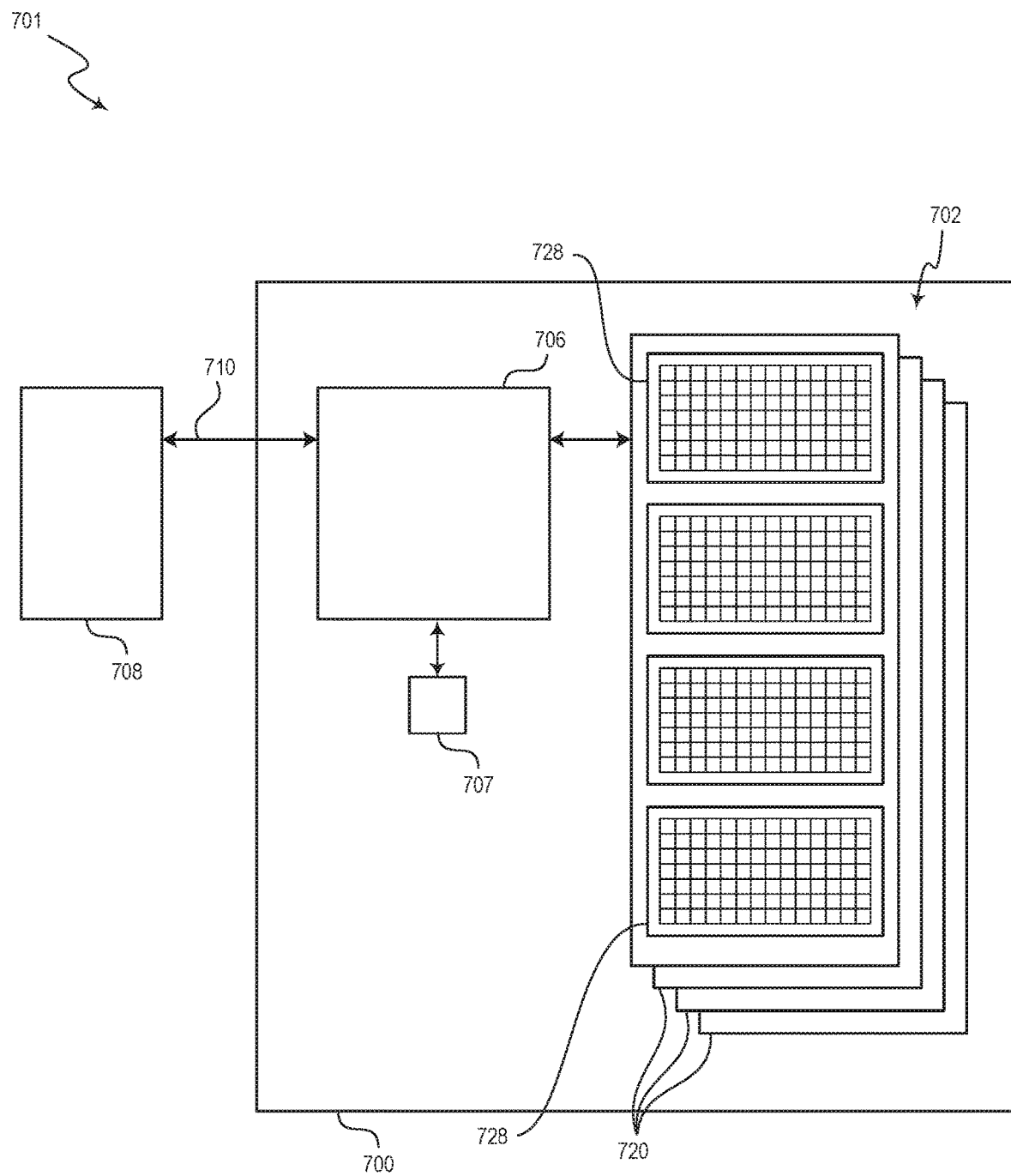
FIG. 7 is a block diagram schematically illustrating a memory system in accordance with an embodiment of the present technology.

FIG. 7 is a block diagram schematically illustrating a memory system 701 in accordance with an embodiment of the present technology. The memory system 701 includes a memory device 700, which may be an example of or include aspects of the memory device 100 described with reference to FIG. 1. As shown, the memory device 700 includes a main memory 702 (e.g., DRAM, NAND flash, NOR flash, FeRAM, PCM, etc.) and control circuitry 706 operably coupled to a host device 708 (e.g., an upstream central processing unit (CPU)). The main memory 702 may be an example of or include aspects of the memory array 150 described with reference to FIG. 1. The control circuitry 706 include aspects of various components described with reference to FIGS. 1 through 6. For example, the control circuitry 706 may include aspects of the command/address input circuit 105, the TM control circuit 175, the fuse control component 510, authentication components 560, authentication components 660, among others. Further, the memory device 700 includes a fuse array 707 (or an array of other types of nonvolatile memory elements), which may be an example of or include aspects of the fuse array 180 described with reference to FIG. 1.

The main memory 702 includes a plurality of memory units 720, which each include a plurality of memory cells. The memory units 720 can be individual memory dies, memory planes in a single memory die, a stack of memory dies vertically connected with through-silicon vias (TSVs), or the like. For example, in one embodiment, each of the memory units 720 can be formed from a semiconductor die and arranged with other memory unit dies in a single device package. In other embodiments, multiple memory units 720 can be co-located on a single die and/or distributed across multiple device packages. The memory units 720 may, in some embodiments, also be sub-divided into memory regions 728 (e.g., banks, ranks, channels, blocks, pages, etc.).

The memory cells can include, for example, floating gate, charge trap, phase change, capacitive, ferroelectric, magnetoresistive, and/or other suitable storage elements configured to store data persistently or semi-persistently. The main memory 702 and/or the individual memory units 720 can also include other circuit components, such as multiplexers, decoders, buffers, read/write drivers, address registers, data out/data in registers, etc., for accessing and/or programming (e.g., writing) the memory cells and other functions, such as for processing information and/or communicating with the control circuitry 706 or the host device 708. Although shown in the illustrated embodiments with a certain number of memory cells, rows, columns, regions, and memory units for purposes of illustration, the number of memory cells, rows, columns, regions, and memory units can vary, and can, in other embodiments, be larger or smaller in scale than shown in the illustrated examples. For example, in some embodiments, the memory device 700 can include only one memory unit 720. Alternatively, the memory device 700 can include two, three, four, eight, ten, or more (e.g., 16, 32, 64, or more) memory units 720. Although the memory units 720 are shown in FIG. 7 as including four memory regions 728 each, in other embodiments, each memory unit 720 can include one, two, three, eight, or more (e.g., 16, 32, 64, 100, 128, 256, or more) memory regions.

In one embodiment, the control circuitry 706 can be provided on the same die as the main memory 702 (e.g., including command/address/clock input circuitry, decoders, voltage and timing generators, input/output circuitry, etc.). In another embodiment, the control circuitry 706 can be a microcontroller, special purpose logic circuitry (e.g., a field programmable gate array (FPGA), an application specific integrated circuit (ASIC), control circuitry on a memory die, etc.), or other suitable processor. In one embodiment, the control circuitry 706 can include a processor configured to execute instructions stored in memory to perform various processes, logic flows, and routines for controlling operation of the memory device 700, including managing the main memory 702 and handling communications between the memory device 700 and the host device 708. In some embodiments, the control circuitry 706 can include embedded memory with memory registers for storing, e.g., row counters, bank counters, memory pointers, fetched data, etc. In another embodiment of the present technology, a memory device 700 may not include control circuitry, and may instead rely upon external control (e.g., provided by the host device 708, or by a processor or controller separate from the memory device 700).

The host device 708 can be any one of a number of electronic devices capable of utilizing memory for the temporary or persistent storage of information, or a component thereof. For example, the host device 708 may be a computing device such as a desktop or portable computer, a server, a hand-held device (e.g., a mobile phone, a tablet, a digital reader, a digital media player), or some component thereof (e.g., a central processing unit, a co-processor, a dedicated memory controller, etc.). The host device 708 may be a networking device (e.g., a switch, a router, etc.) or a recorder of digital images, audio and/or video, a vehicle, an appliance, a toy, or any one of a number of other products. In one embodiment, the host device 708 may be connected directly to memory device 700, although in other embodiments, the host device 708 may be indirectly connected to memory device (e.g., over a networked connection or through intermediary devices).

In operation, the control circuitry 706 can directly write or otherwise program (e.g., erase) the various memory regions of the main memory 702. The control circuitry 706 communicates with the host device 708 over a host-device bus or interface 710. In some embodiments, the host device 708 and the control circuitry 706 can communicate over a dedicated memory bus (e.g., a DRAM bus). In other embodiments, the host device 708 and the control circuitry 706 can communicate over a serial interface, such as a serial attached SCSI (SAS), a serial AT attachment (SATA) interface, a peripheral component interconnect express (PCIe), or other suitable interface (e.g., a parallel interface). The host device 708 can send various requests (in the form of, e.g., a packet or stream of packets) to the control circuitry 706. A request can include a command to read, write, erase, return information, and/or to perform a particular operation (e.g., a refresh operation, a TRIM operation, a precharge operation, an activate operation, a wear-leveling operation, a garbage collection operation, etc.).

In some embodiments, the control circuitry 706 can be configured to track operations (e.g., read operations, write operations, erase operations, activate operations, etc.) performed in the main memory 702 (e.g., in a register or table in an embedded memory of the control circuitry 706) in multiple memory units 720 to facilitate performing refresh operations on an as-needed basis. In this regard, the control circuitry 706 can be configured to compare the number or rate of operations experienced by different memory units 720 and to perform or schedule refresh operations on the memory units 720 based on a comparison between the number or rate of operations experienced by the memory units 720. Alternatively, the control circuitry 706 can be configured to perform or schedule refresh operations on the memory units 720 based on a comparison of each memory unit 720 to one or more predetermined thresholds (e.g., threshold numbers of operations, threshold rates of operations, etc.). Accordingly, a memory unit 720 which is the target of operations that exceed a threshold number or rate can be refreshed more frequently than another unit 720, due to the freedom with which different units 720 can be subjected to out-of-order refresh operations.

In some cases, the memory device 700 may be configured to allow a customer to determine and store a user-defined access key (e.g., a first access key) in the fuse array 707 using a special programming mode—e.g., the PPR mode. During operation of the memory system 701, the host device 708 may generate and transmit an access command directed to the fuse array 707 to the memory device 700. The access command may include an access key (e.g., a second access key) provided by the host device 708. The memory device 700 (e.g., the control circuitry 706) may receive the access command directed to the fuse array 707 and retrieve the user-defined access key from the fuse array 707. The memory device 700 may compare the user-defined access key with the access key (e.g., the second access key) included in the access command. Further, the memory device 700 may determine whether to permit or prohibit execution of the access command at the fuse array 707 based on comparing the user-defined access key with the second access key.

In some cases, the memory device 700 may block control signals generated in response to receiving the access command from reaching the fuse array 707 based on the determination (e.g., when the second access key does not match the user-defined access key), where the control signals comprise one or more addresses of fuses of the fuse array 707, a read command associated with the one or more addresses, a write command associated with the one or more addresses, or a combination thereof. In some cases, when the second access key does not match the user-defined access key, the memory device 700 may disable a voltage source (e.g., the fuse programming voltage source 530) coupled with the fuse array 707 and configured to generate a fuse programming voltage. In some cases, the fuse programming voltage may be greater than an operating voltage of the memory device 700.

In some cases, the memory device 700 may be configured to store a FID-based access key at a predetermined set of addresses of a fuse array 707. Also, the host device 708 (e.g., the manufacturer of the memory device 700, the customer informed of the predetermined set of address to read the FID-based access key) may retrieve the FID-based access key from the fuse array 707 using the predetermined set of addresses. Subsequently, the host device 708 may generate and transmit an access command (e.g., a write command) including a second access key (e.g., the FID-based access key if the host device is either the manufacturer or the customer informed of the predetermined set of addresses) to the memory device 700. Further, the memory device 700 may determine whether to permit or prohibit execution of an access command (e.g., a write command when the access command is directed to programming one or more fuses of the fuse array 707) directed to the fuse array 707 based on comparing the FID-based access key with the second access key included in the access command.

In some cases, the memory device 700 may be configured to encode the FID-based access key prior to storing the FID-based access key to the fuse array 707, where the host device 708 may be configured to decode the FID-based access key after retrieving the encoded FID-based access key. In some cases, encoding the FID-based access key may include partitioning the FID-based access key to multiple portions that each correspond to individual addresses of the predetermined set of addresses, and where decoding the access key may include concatenating the multiple portions to restore the FID-based access key. In some cases, encoding the FID-based access key may include modifying the FID-based access key using a hash function, and where decoding the FID-based access key may include restoring the FID-based access key using an inverse of the hash function.

In some cases, the manufacturer of the memory device 700 may define a secret access key (e.g., an access key hidden from a third party or a customer) and store the secret access key at a set of nonvolatile memory elements of the memory device 700. The set of nonvolatile memory elements may include one or more fuses of the fuse array 707, one or more conductive layers (e.g., one or more metal interconnect layers) of the memory device 700, or both. Further, the manufacturer may configure one or more pins of the memory device 700 such that the memory device 700 may transmit the secret access key to the host device 708 in response to receiving a predetermined sequence of signals from the host device 708. The one or more pins are, however, designated for otherwise only receiving signals from the host device 708. In this manner, the manufacturer may achieve multiple levels of obfuscation to protect the secret access key—i.e., using the predetermined sequence of signals and the one or more pins designated for otherwise only receiving signals as described in greater details herein.

First, the host device 708 must have prior knowledge of the predetermined sequence of signals to transmit to the memory device 700 via a first channel. In some cases, the predetermined sequence of signals may correspond to a predetermined sequence of two or more commands directed to the memory device 700—e.g., three (3) read commands followed by two (2) write commands having nothing in between. In some cases, the predetermined sequence of signals corresponds to a predetermined combination of two or more voltage (or current) levels as a function of time during a fixed duration. Only when the memory device 700 receives the predetermine sequence of signals from the host device 708, the memory device 700 is configured to retrieve and transmit the secret access key back to the host device 708. In some cases, the manufacturer may choose to use different sequences of signals for different product groups to which the memory device 700 belongs such that even when a sequence of signals for a certain product group is accidentally revealed, a risk associated with revealing the sequence of signals may be confined to the product group.

Second, the host device 708 must have prior knowledge of which pin(s) to monitor to receive the secret access key via a second channel after transmitting the predetermined sequence of signals to the memory device 700 via the first channel. Because the memory device 700 configures the pin(s) designated as input only pin(s) for the memory device 700 to transmit (e.g., output) the secret access key to the host device 708, a board configured to house the host device 708 and the memory device 700 is required to enable the host device 708 to receive the secret access key from the memory device 700 using the pin(s). In this manner, the manufacturer may protect the secret access key from a third party that may not have prior knowledge of the predetermined sequence of signals to transmit to the memory device 700 and of the one or more pins to monitor to receive the secret access key from the memory device 700.

When the host device 708 successfully receives the secret access key, the host device 708 may generate an access command directed to the fuse array 707 of the memory device 700, where the access command includes a second access key (e.g., the secret access key received from the memory device 700). Subsequently, the memory device 700 may retrieve the secret access key from the set of nonvolatile memory elements in response to receiving the access command from the host device 708 and compare the second access key included in the access command with the secret access key. The memory device 700 may determine whether to permit or prohibit execution of the access command at the fuse array based on comparing the secret access key with the second access key included in the access command as described herein with reference to FIGS. 1 through 5.

Figure 8:
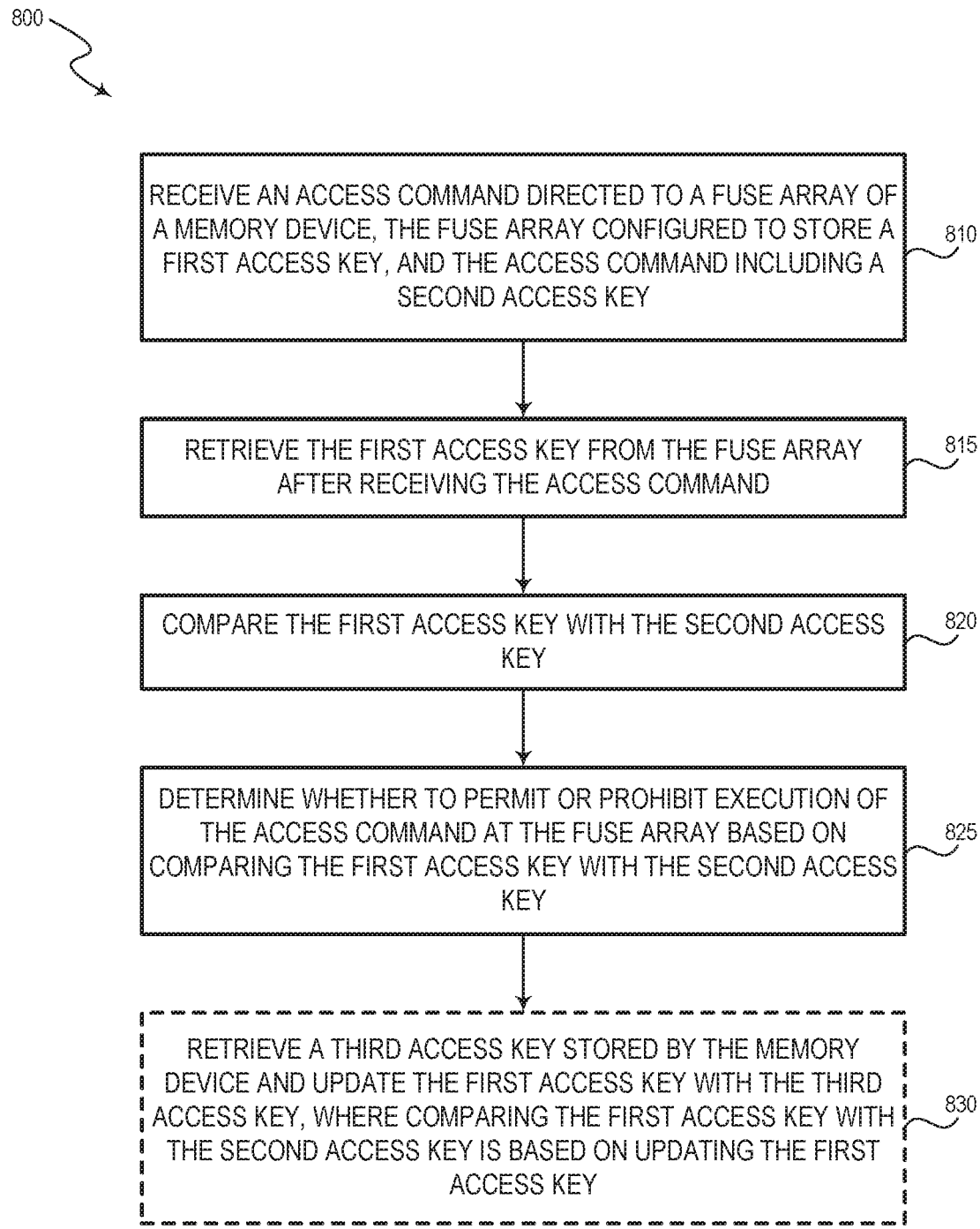
FIGS. 8 through 11 are flow charts illustrating methods of operating a memory device and a memory system including the memory device in accordance with embodiments of the present technology.

FIG. 8 is a flow chart 800 illustrating a method of operating a memory device in accordance with an embodiment of the present technology. The flow chart 800 may be an example of or include aspects of a method that the memory device 100 (or the control circuitry 706 of the memory device 700) may perform as described with reference to FIGS. 1 through 5 and 7.

The method includes receiving an access command directed to a fuse array of a memory device, where the fuse array is configured to store a first access key, and the access command includes a second access key (box 810). In accordance with one aspect of the present technology, the receiving feature of box 810 can be performed by a control circuitry (e.g., the control circuitry 706 of FIG. 7) or the command/address input circuit 105 as described with reference to FIGS. 1 through 5 and 7.

The method further includes retrieving the first access key from the fuse array after receiving the access command (box 815). In accordance with one aspect of the present technology, the retrieving feature of box 815 can be performed by the control circuitry (e.g., the control circuitry 706 of FIG. 7) or the authentication components 560 as described with reference to FIGS. 1 through 5 and 7.

The method further includes comparing the first access key with the second access key (box 820). In accordance with one aspect of the present technology, the comparing feature of box 820 can be performed by the control circuitry (e.g., the control circuitry 706 of FIG. 7) or the authentication components 560 as described with reference to FIGS. 1 through 5 and 7.

The method further includes determining whether to permit or prohibit execution of the access command at the fuse array based on comparing the first access key with the second access key (box 825). In accordance with one aspect of the present technology, the comparing feature of box 825 can be performed by the control circuitry (e.g., the control circuitry 706 of FIG. 7) or the authentication components 560 as described with reference to FIGS. 1 through 5 and 7.

The method can further include retrieving a third access key stored by the memory device and updating the first access key with the third access key, where comparing the first access key with the second access key is based on updating the first access key (box 830). In accordance with one aspect of the present technology, the retrieving and comparing feature of box 830 can be performed by the control circuitry (e.g., the control circuitry 706 of FIG. 7) or the authentication components 560 as described with reference to FIGS. 1 through 5 and 7.

In some embodiments, prohibiting the execution may include blocking control signals generated in response to receiving the access command from the fuse array based on the determination, where the control signals include one or more addresses of fuses of the fuse array, a read command associated with the one or more addresses, a write command associated with the one or more addresses, or a combination thereof. In some embodiments, prohibiting the execution may include disabling a voltage source coupled with the fuse array, where the voltage source is configured to generate a fuse programming voltage. In some embodiments, the fuse programming voltage may be greater than an operating voltage of the memory device.

In some embodiments, prohibiting the execution may include determining, based on a security mode associated with the first access key, whether to block control signals from the fuse array or to disable a voltage source coupled with the fuse array, where the control signals are generated in response to receiving the access command. In some embodiments, prohibiting the execution may include disabling circuitry configured to perform test mode functions including generating control signals for the fuse array in response to receiving the access command directed to the fuse array.

Figure 9:
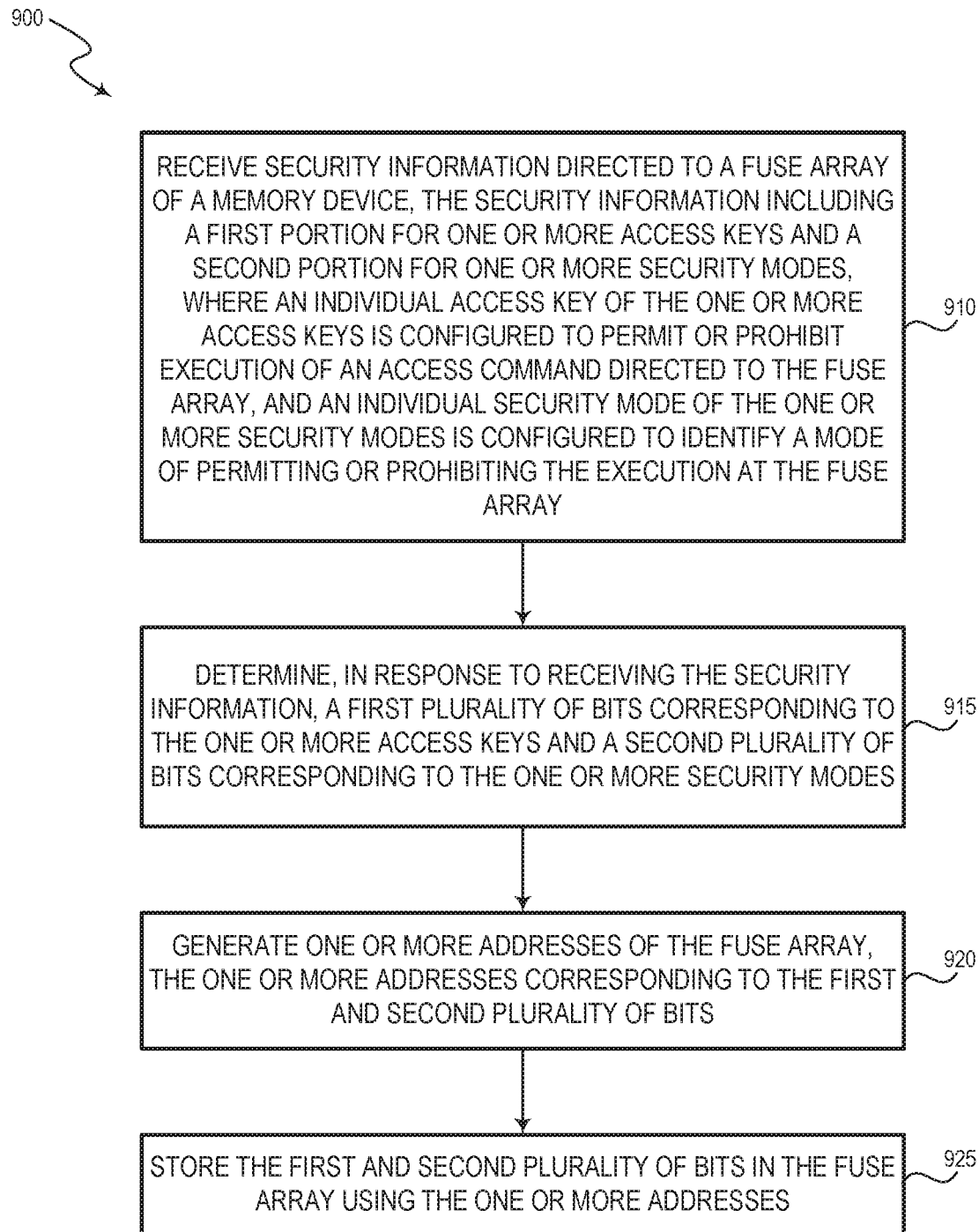

FIG. 9 is a flow chart 900 illustrating a method of operating a memory device in accordance with an embodiment of the present technology. The flow chart 900 may be an example of or include aspects of a method that the memory device 100 (or the control circuitry 706 of the memory device 700) may perform as described with reference to FIGS. 1 through 5 and 7.

The method includes receiving security information directed to a fuse array of a memory device, where the security information includes a first portion for one or more access keys and a second portion for one or more security modes, and where an individual access key of the one or more access keys is configured to permit or prohibit execution of an access command directed to the fuse array, and an individual security mode of the one or more security modes is configured to identify a mode of permitting or prohibiting the execution at the fuse array (box 910). In accordance with one aspect of the present technology, the receiving feature of box 910 can be performed by a control circuitry (e.g., the control circuitry 706 of FIG. 7) as described with reference to FIGS. 1 through 5 and 7.

The method further includes determining, in response to receiving the security information, a first plurality of bits corresponding to the one or more access keys and a second plurality of bits corresponding to the one or more security modes (box 915). In accordance with one aspect of the present technology, the determining feature of box 915 can be performed by the control circuitry (e.g., the control circuitry 706 of FIG. 7) as described with reference to FIGS. 1 through 5 and 7.

The method further includes generating one or more addresses of the fuse array, where the one or more addresses correspond to the first and second plurality of bits (box 920). In accordance with one aspect of the present technology, the generating feature of box 920 can be performed by the control circuitry (e.g., the control circuitry 706 of FIG. 7) or the fuse control component 510 as described with reference to FIGS. 1 through 5 and 7.

The method further includes storing the first and second plurality of bits in the fuse array using the one or more addresses (box 925). In accordance with one aspect of the present technology, the generating feature of box 925 can be performed by the control circuitry (e.g., the control circuitry 706 of FIG. 7) or the fuse control component 510 as described with reference to FIGS. 1 through 5 and 7.

In some embodiments, the one or more security modes may comprise disabling a circuit configured to perform test mode functions including generating control signals for the fuse array, blocking the control signals from the fuse array, or disabling a voltage source coupled with the fuse array and configured to generate a fuse programming voltage. In some embodiments, a particular mode of permitting or prohibiting the execution at the fuse array may be determined based on a combination of the one or more access keys and the one or more security modes.

In some embodiments, the first portion may comprise an access key common to the one or more security modes such that a particular mode of permitting or prohibiting the execution at the fuse array is determined based on the access key in conjunction with the one or more security modes. In some embodiments, the first portion may comprise two or more access keys that are different from each other such that a particular mode of permitting or prohibiting the execution at the fuse array is determined based on the two or more access keys. In some embodiments, storing the first and second plurality of bits may comprise enabling a voltage source coupled with the fuse array and configured to generate a fuse programming voltage that is greater than an operating voltage of the memory device.

Figure 10:
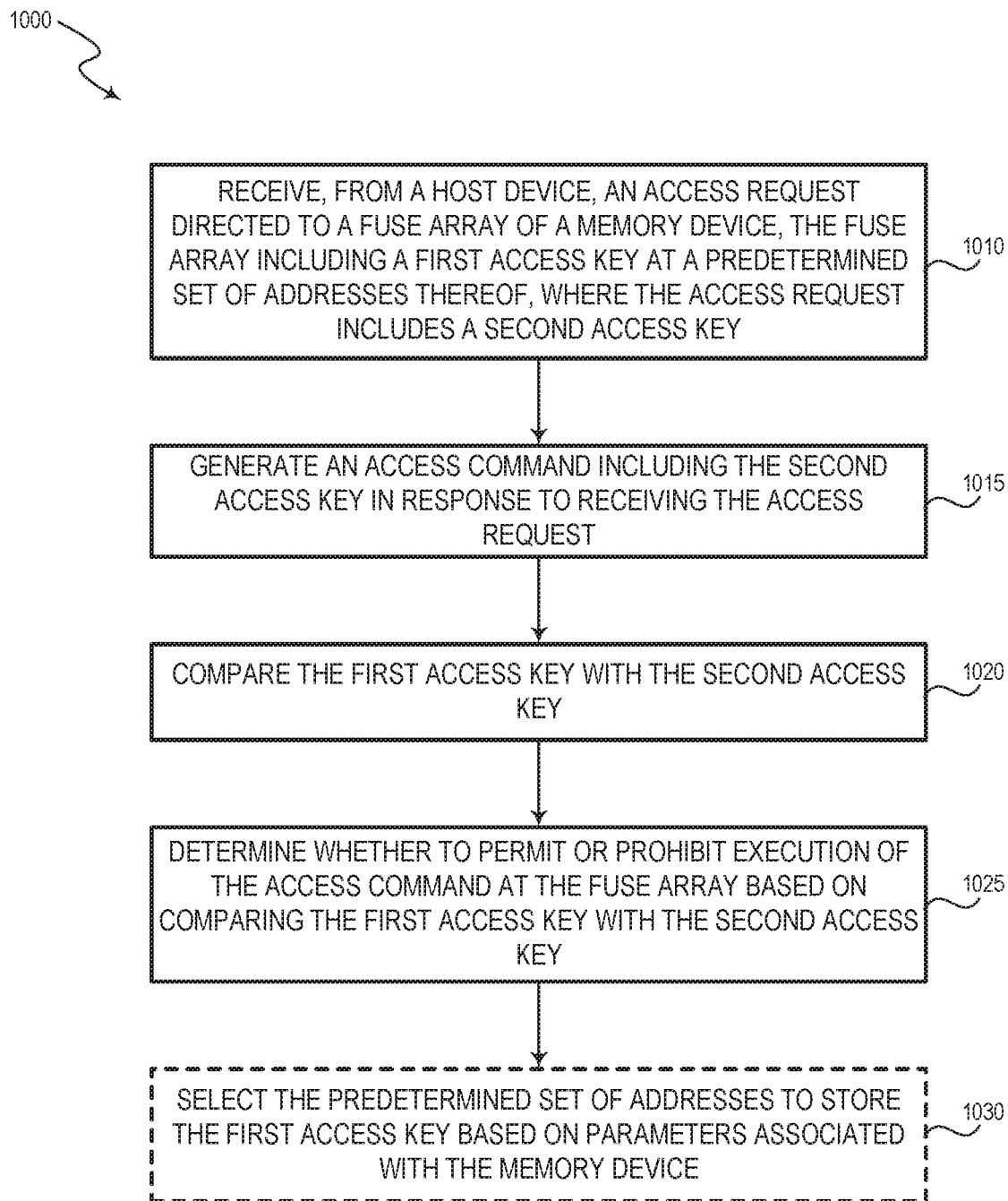

FIG. 10 is a flow chart 1000 illustrating a method of operating a memory device in accordance with an embodiment of the present technology. The flow chart 1000 may be an example of or include aspects of a method that the memory device 100 (or the control circuitry 706 of the memory device 700) may perform as described with reference to FIGS. 1 through 4, 6, and 7.

The method includes receiving, from a host device, an access request directed to a fuse array of a memory device, where the fuse array includes a first access key at a predetermined set of addresses thereof, and where the access request includes a second access key (box 1010). In accordance with one aspect of the present technology, the receiving feature of box 1010 can be performed by a control circuitry (e.g., the control circuitry 706 of FIG. 7) or the command/address input circuit 105 as described with reference to as described with reference to FIGS. 1 through 4, 6, and 7.

The method further includes generating an access command including the second access key in response to receiving the access request (box 1015). In accordance with one aspect of the present technology, the generating feature of box 1015 can be performed by the control circuitry (e.g., the control circuitry 706 of FIG. 7) or the fuse control component 510 as described with reference to FIGS. 1 through 4, 6, and 7.

The method further includes comparing the first access key with the second access key (box 1020). In accordance with one aspect of the present technology, the comparing feature of box 1020 can be performed by the control circuitry (e.g., the control circuitry 706 of FIG. 7) or the authentication component 660 as described with reference to FIGS. 1 through 4, 6, and 7.

The method further includes determining whether to permit or prohibit execution of the access command at the fuse array based on comparing the first access key with the second access key (box 1025). In accordance with one aspect of the present technology, the determining feature of box 1025 can be performed by the control circuitry (e.g., the control circuitry 706 of FIG. 7) or the authentication component 660 as described with reference to FIGS. 1 through 4, 6, and 7.

The method can further include selecting the predetermined set of addresses to store the first access key based on parameters associated with the memory device (box 1030). In accordance with one aspect of the present technology, the selecting feature of box 1025 can be performed by the control circuitry (e.g., the control circuitry 706 of FIG. 7) as described with reference to FIGS. 1 through 4, 6, and 7.

Additionally or alternatively, the method can further include encoding the first access key prior to storing the first access key at the predetermined set of addresses. In accordance with one aspect of the present technology, the encoding feature can be performed by the control circuitry (e.g., the control circuitry 706 of FIG. 7) as described with reference to FIGS. 1 through 4, 6, and 7.

In some embodiments, the first access key may be configured to identify the memory device based on metadata for manufacturing information about the memory device. In some embodiments, prohibiting the execution may include nullifying the access command when the first access key is different from the second access key. In some embodiments, prohibiting the execution may include blocking the write command from reaching the fuse array when the first access key is different from the second access key. In some embodiments, prohibiting the execution may include disabling a voltage source coupled with the fuse array and configured to generate a fuse programming voltage when the first access key is different from the second access key.

Figure 11:
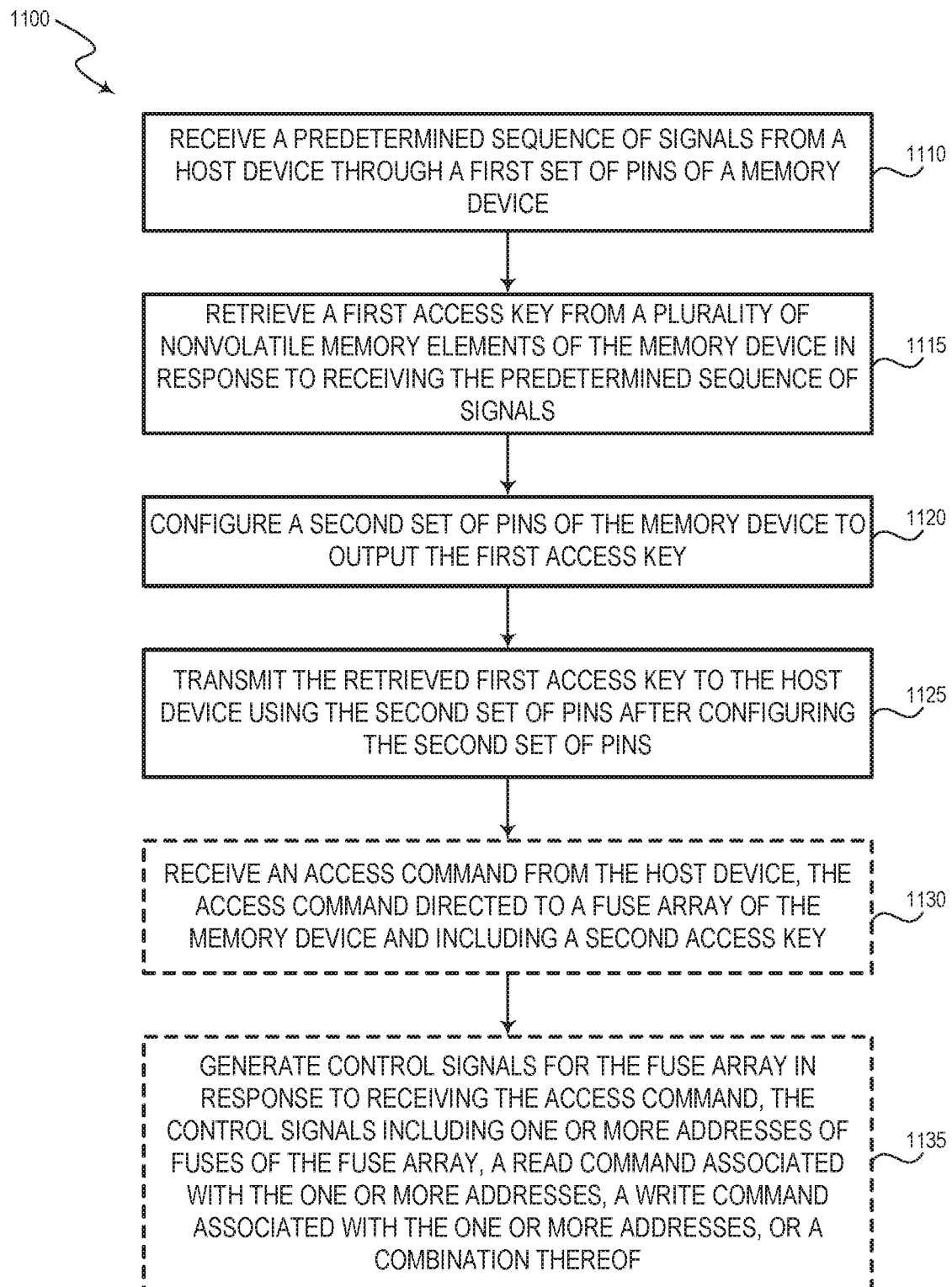

FIG. 11 is a flow chart 1100 illustrating a method of operating a memory device in accordance with an embodiment of the present technology. The flow chart 1100 may be an example of or include aspects of a method that the memory device 100 (or the control circuitry 706 of the memory device 700) may perform as described with reference to FIGS. 1 through 5 and 7.

The method includes receiving a predetermined sequence of signals from a host device through a first set of pins of a memory device (box 1110). In accordance with one aspect of the present technology, the receiving feature of box 1110 can be performed by a control circuitry (e.g., the control circuitry 706 of FIG. 7) or the command/address input circuit 105 as described with reference to FIGS. 1 through 5 and 7.

The method further includes retrieving a first access key from a plurality of nonvolatile memory elements of the memory device in response to receiving the predetermined sequence of signals (box 1115). In accordance with one aspect of the present technology, the retrieving feature of box 1115 can be performed by the control circuitry (e.g., the control circuitry 706 of FIG. 7) as described with reference to FIGS. 1 through 5 and 7.

The method further includes configuring a second set of pins of the memory device to output the first access key (box 1120). In accordance with one aspect of the present technology, the configuring feature of box 1120 can be performed by the control circuitry (e.g., the control circuitry 706 of FIG. 7) as described with reference to FIGS. 1 through 5 and 7.

The method further includes transmitting the retrieved first access key to the host device using the second set of pins after configuring the second set of pins (box 1125). In accordance with one aspect of the present technology, the transmitting feature of box 1125 can be performed by the control circuitry (e.g., the control circuitry 706 of FIG. 7) in conjunction with the input/output circuit 160 as described with reference to FIGS. 1 through 5 and 7.

The method can further includes receiving an access command from the host device, the access command directed to a fuse array of the memory device and including a second access key (box 1130). In accordance with one aspect of the present technology, the transmitting feature of box 1130 can be performed by the control circuitry (e.g., the control circuitry 706 of FIG. 7) in conjunction with the command/address input circuit 105 as described with reference to FIGS. 1 through 5 and 7.

The method can further includes generating control signals for the fuse array in response to receiving the access command, where the control signals includes one or more addresses of fuses of the fuse array, a read command associated with the one or more addresses, a write command associated with the one or more addresses, or a combination thereof (box 1135). In accordance with one aspect of the present technology, the generating feature of box 1135 can be performed by the control circuitry (e.g., the control circuitry 706 of FIG. 7) or the fuse control component 510 as described with reference to FIGS. 1 through 5 and 7.

Additionally or alternatively, the method can further include comparing the first access key with the second access key to determine whether the second access key corresponds to the first access key and determining whether to permit or prohibit execution of the access command at the fuse array based on comparing the first access key with the second access key. In some embodiments, the second set of pins are designated for otherwise receiving inputs only from the host device. In some embodiments, prohibiting the execution when the second access key is different from the first access key may include blocking the control signals from reaching the fuse array, disabling a voltage source coupled with the fuse array and configured to generate a fuse programming voltage, or disabling circuitry of the memory device configured to perform test mode functions different from generating the control signals for the fuse array.

It should be noted that the methods described above describe possible implementations, and that the operations and the steps may be rearranged or otherwise modified and that other implementations are possible. Furthermore, embodiments from two or more of the methods may be combined.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, it will be understood by a person of ordinary skill in the art that the signal may represent a bus of signals, where the bus may have a variety of bit widths.

The devices discussed herein, including a memory device, may be formed on a semiconductor substrate or die, such as silicon, germanium, silicon-germanium alloy, gallium arsenide, gallium nitride, etc. In some cases, the substrate is a semiconductor wafer. In other cases, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

The functions described herein may be implemented in hardware, software executed by a processor, firmware, or any combination thereof. Other examples and implementations are within the scope of the disclosure and appended claims. Features implementing functions may also be physically located at various positions, including being distributed such that portions of functions are implemented at different physical locations.

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

From the foregoing, it will be appreciated that specific embodiments of the invention have been described herein for purposes of illustration, but that various modifications may be made without deviating from the scope of the invention. Rather, in the foregoing description, numerous specific details are discussed to provide a thorough and enabling description for embodiments of the present technology. One skilled in the relevant art, however, will recognize that the disclosure can be practiced without one or more of the specific details. In other instances, well-known structures or operations often associated with memory systems and devices are not shown, or are not described in detail, to avoid obscuring other aspects of the technology. In general, it should be understood that various other devices, systems, and methods in addition to those specific embodiments disclosed herein may be within the scope of the present technology.

What is claimed is:

1. A memory device, comprising:
   a memory array;
   a plurality of nonvolatile memory elements configured to store a first access key; and
   peripheral circuitry coupled to the plurality of nonvolatile memory elements and the memory array, and configured to:
   receive a predetermined sequence of signals from a host device;
   retrieve the first access key from the plurality of nonvolatile memory elements in response to receiving the predetermined sequence of signals;
   configure one or more pins to output the first access key; and
   transmit the first access key using the one or more pins after configuring the one or more pins.

2. The memory device of claim 1, wherein the one or more pins are designated for otherwise receiving inputs only.

3. The memory device of claim 1, wherein the plurality of nonvolatile memory elements includes one or more fuses of a fuse array of the memory device, one or more conductive layers of the memory device, or both.

4. The memory device of claim 1, wherein the peripheral circuitry is configured to generate control signals for a fuse array of the memory device in response to receiving an access command directed to the fuse array, the access command including a second access key.

5. The memory device of claim 4, further comprising:
   an authentication component coupling the peripheral circuitry with the fuse array, the authentication component configured to:
   receive the first access key and the second access key from the peripheral circuitry;
   compare the first access key with the second access key to determine whether the second access key corresponds to the first access key; and
   determine whether to permit or prohibit execution of the access command at the fuse array based on comparing the first access key with the second access key.

6. The memory device of claim 5, wherein the authentication component is configured to block the control signals from reaching the fuse array when the second access key is different from the first access key, the control signals comprising one or more addresses of fuses of the fuse array, a read command associated with the one or more addresses, a write command associated with the one or more addresses, or a combination thereof.

7. The memory device of claim 5, wherein the authentication component is configured to disable a voltage source coupled with the fuse array and configured to generate a fuse programming voltage.

8. The memory device of claim 5, wherein the authentication component is configured to disable the peripheral circuitry, wherein the peripheral circuitry is further configured to perform test mode functions different from generating the control signals for the fuse array.

9. The memory device of claim 5, wherein the authentication component is configured to nullify the access command when the second access key is different from the first access key.

10. A method, comprising:
receiving a predetermined sequence of signals from a host device through a first set of pins of a memory device;
retrieving a first access key from a plurality of nonvolatile memory elements of the memory device in response to receiving the predetermined sequence of signals;
configuring a second set of pins of the memory device to output the first access key; and
transmitting the retrieved first access key to the host device using the second set of pins after configuring the second set of pins.

11. The method of claim 10, wherein the second set of pins are designated for otherwise receiving inputs only from the host device.

12. The method of claim 10, further comprising:
receiving an access command from the host device, the access command directed to a fuse array of the memory device and including a second access key; and
generating control signals for the fuse array in response to receiving the access command, the control signals including one or more addresses of fuses of the fuse array, a read command associated with the one or more addresses, a write command associated with the one or more addresses, or a combination thereof.

13. The method of claim 12, further comprising:
comparing the first access key with the second access key to determine whether the second access key corresponds to the first access key; and
determining whether to permit or prohibit execution of the access command at the fuse array based on comparing the first access key with the second access key.

14. The method of claim 13, wherein prohibiting the execution when the second access key is different from the first access key includes:
blocking the control signals from reaching the fuse array;
disabling a voltage source coupled with the fuse array and configured to generate a fuse programming voltage; or
disabling circuitry of the memory device configured to perform test mode functions different from generating the control signals for the fuse array.

15. A system, comprising:
a host device configured to:
transmit a predetermined sequence of signals through a first channel coupled with a memory device; and
monitor a second channel coupled with the memory device for a first access key sent from the memory device in response to receiving the predetermined sequence of signals;
wherein the memory device is configured to:
receive the predetermined sequence of signals through the first channel;
retrieve the first access key from a plurality of nonvolatile memory elements in response to receiving the predetermined sequence of signals;
configure one or more pins of the memory device to output the first access key, wherein the one or more pins are coupled with the second channel; and
transmit the first access key to the host device using the one or more pins.

16. The system of claim 15, wherein the one or more pins of the memory device are designated for otherwise only receiving signals from the host device.

17. The system of claim 15, wherein the predetermined sequence of signals corresponds to a predetermined sequence of two or more commands directed to the memory device.

18. The system of claim 15, wherein the predetermined sequence of signals corresponds to a predetermined combination of two or more voltage levels as a function of time during a fixed duration.

19. The system of claim 15, wherein the host device is further configured to:
receive the first access key sent from the memory device through the second channel; and
generate an access command directed to a fuse array of the memory device, the access command including the first access key.

20. The system of claim 15, wherein the memory device is further configured to:
retrieve the first access key from the plurality of nonvolatile memory elements in response to receiving an access command from the host device directed to a fuse array of the memory device, wherein the access command includes a second access key;
compare the first access key with the second access key to determine whether the second access key corresponds to the first access key; and
determine whether to permit or prohibit execution of the access command at the fuse array based on comparing the first access key with the second access key.

* * * * *